United States Patent
Rajendran et al.

(10) Patent No.: US 11,098,791 B2
(45) Date of Patent: Aug. 24, 2021

(54) CONTINUOUSLY VARIABLE TRANSMISSION WITH UNIFORM INPUT-TO-OUTPUT RATIO THAT IS NON-DEPENDENT ON FRICTION

(71) Applicants: Raja Ramanujam Rajendran, Troy, MI (US); Prashanth Ram Rajendran, Troy, MI (US)

(72) Inventors: Raja Ramanujam Rajendran, Troy, MI (US); Prashanth Ram Rajendran, Troy, MI (US)

(*) Notice: Subject to any disclaimer, the term of this patent is extended or adjusted under 35 U.S.C. 154(b) by 368 days.

(21) Appl. No.: 15/455,201

(22) Filed: Mar. 10, 2017

(65) Prior Publication Data

US 2018/0209523 A1 Jul. 26, 2018

Related U.S. Application Data

(63) Continuation-in-part of application No. 13/261,970, filed on Oct. 14, 2014, now Pat. No. 9,970,520.

(51) Int. Cl.
*F16H 29/20* (2006.01)
*F16H 21/36* (2006.01)
(Continued)

(52) U.S. Cl.
CPC ............. *F16H 29/20* (2013.01); *F16H 21/36* (2013.01); *F16H 29/00* (2013.01); *F16H 29/08* (2013.01); *F16H 19/043* (2013.01); *F16H 29/14* (2013.01); *F16H 29/18* (2013.01); *F16H 35/02* (2013.01); *F16H 2035/003* (2013.01)

(58) Field of Classification Search
CPC ........ F16H 19/043; F16H 21/36; F16H 29/00; F16H 29/02; F16H 29/04; F16H 29/06; F16H 29/08; F16H 29/10; F16H 29/12; F16H 29/14; F16H 29/16; F16H 29/18;
(Continued)

(56) References Cited

U.S. PATENT DOCUMENTS

| 335,745 A | * | 2/1886 | De Valin | F16C 3/28 74/600 |
| 2,912,100 A | * | 11/1959 | Logan | F16H 29/02 226/122 |

(Continued)

FOREIGN PATENT DOCUMENTS

FR 2841957 A1 * 1/2004 ............. F16H 29/08

*Primary Examiner* — Joseph Brown

(57) ABSTRACT

This invention is an all gear continuously variable transmission that is non-dependent on friction. It can me be used in high torque applications. It offers a steady and uniform output for a steady and uniform input. It allows a co-axial input and output thereby by using a planetary gear system the output can be made continuous from forward to reverse. This uses a "scotch-yoke" mechanism to convert rotational motion to a linear reciprocating motion. The linear distance of this reciprocating motion-"stroke" is changed by altering the crankpin location of the scotch-yoke mechanism. This reciprocating motion is converted to a rocking motion by using a "rack and pinion" and later converted to a unidirectional motion via a One-Way-Bearing. A set of non-circular gears are used to achieve a steady and uniform output. It employs a very simple mechanism to change the ratio between the input and output of the transmission.

20 Claims, 35 Drawing Sheets

(51) Int. Cl.
  *F16H 29/08* (2006.01)
  *F16H 29/00* (2006.01)
  *F16H 19/04* (2006.01)
  *F16H 35/00* (2006.01)
  *F16H 29/14* (2006.01)
  *F16H 29/18* (2006.01)
  *F16H 35/02* (2006.01)

(58) Field of Classification Search
  CPC .... F16H 29/20; F16H 35/02; F16H 2035/003; F16H 2048/082
  USPC ................... 74/33, 76, 125.5, 832
  See application file for complete search history.

(56) References Cited

U.S. PATENT DOCUMENTS

| | | | | |
|---|---|---|---|---|
| 3,059,502 A | * | 10/1962 | Munz | F16C 3/28 74/600 |
| 3,321,984 A | * | 5/1967 | Nittka | F16H 29/08 74/117 |
| 5,440,945 A | * | 8/1995 | Penn | F16H 29/08 74/117 |
| 5,603,240 A | | 2/1997 | Klovstad et al. | |
| 2010/0199805 A1 | | 8/2010 | Downs | |

* cited by examiner

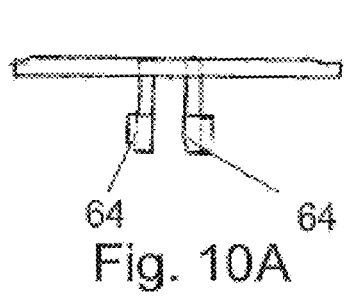
Fig. 10A
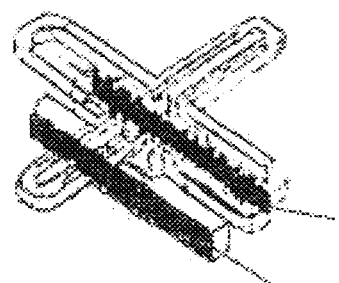
Fig. 10B
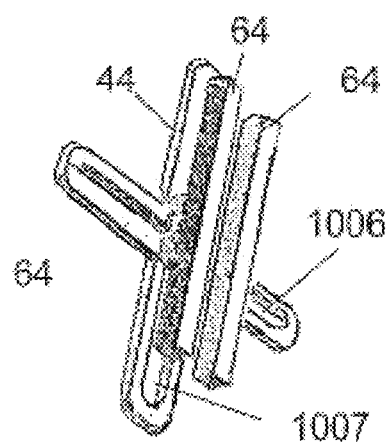
Fig. 10C
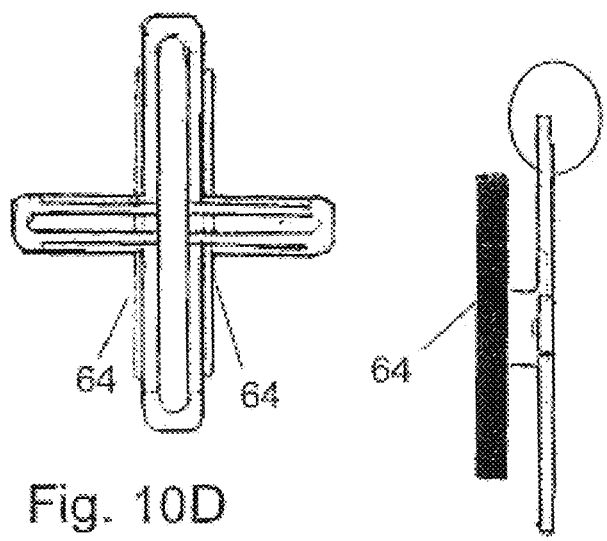
Fig. 10D
Fig. 10E
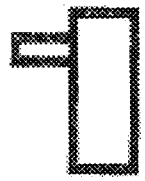
Enlarged view A
Fig. 10G
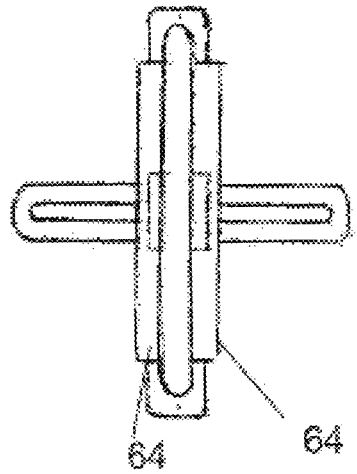
Fig. 10F

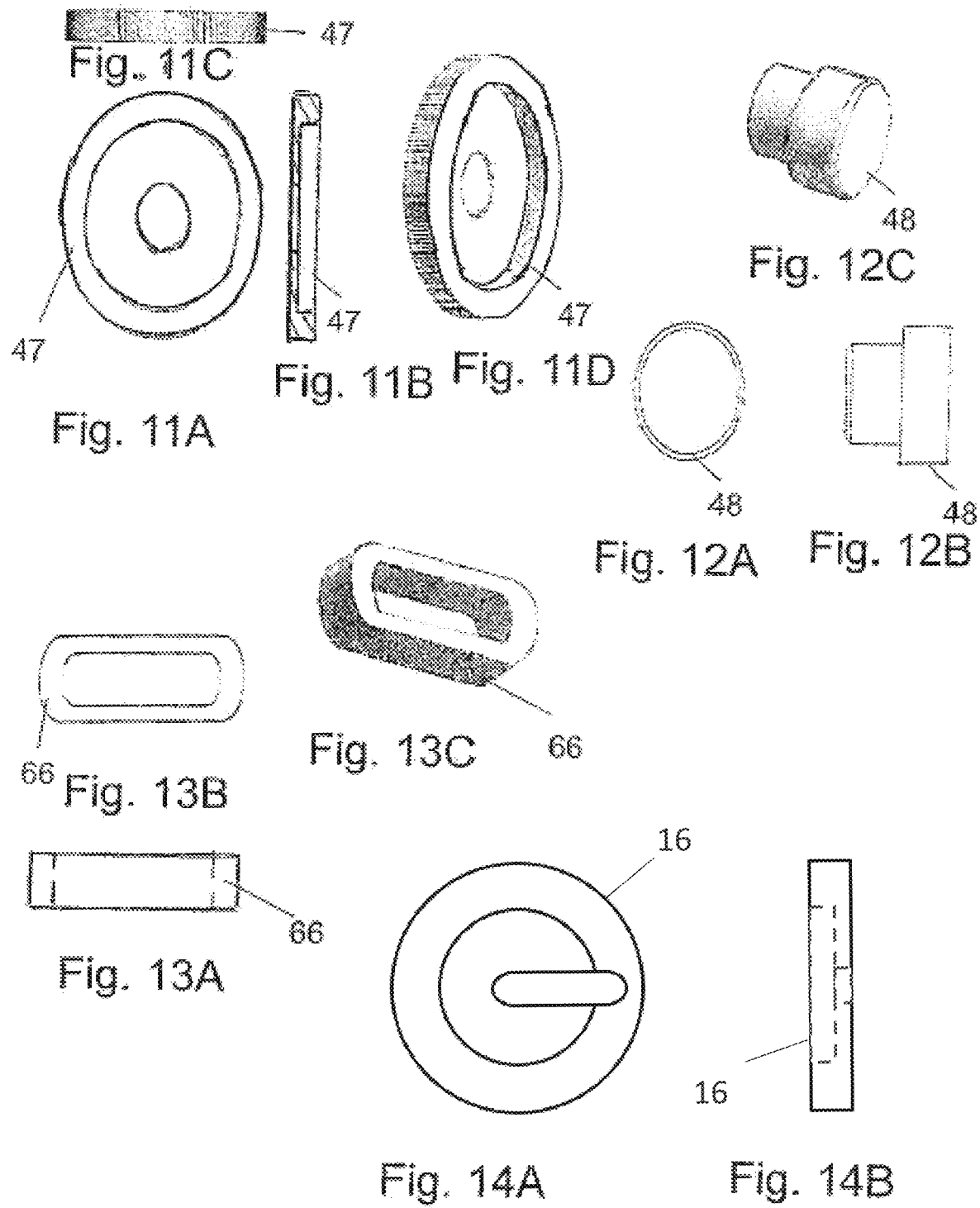

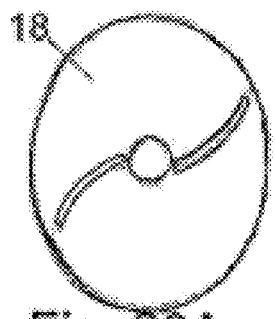
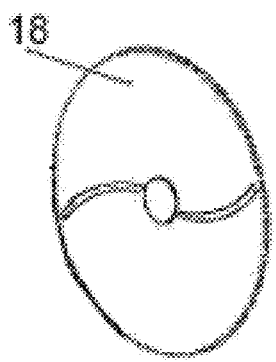
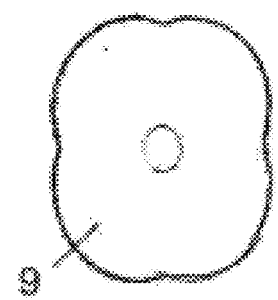
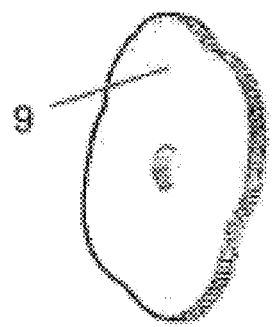
Fig. 20A
Fig. 20B
Fig. 20C
Fig. 21A
Fig. 21C
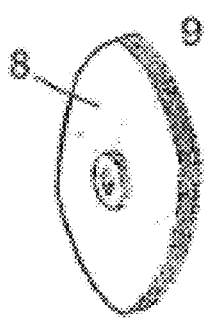
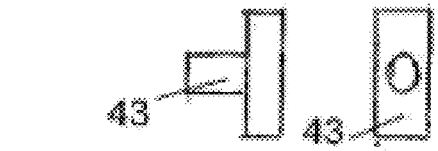
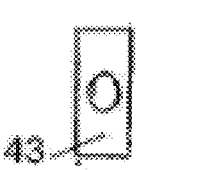
Fig. 21B
Fig. 22C
Fig. 23C
Fig. 22A
Fig. 23A
Fig. 23B
Fig. 22B
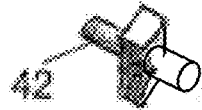
Fig. 24A
Fig. 24D
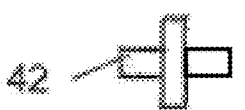
Fig. 24B
Fig. 24C

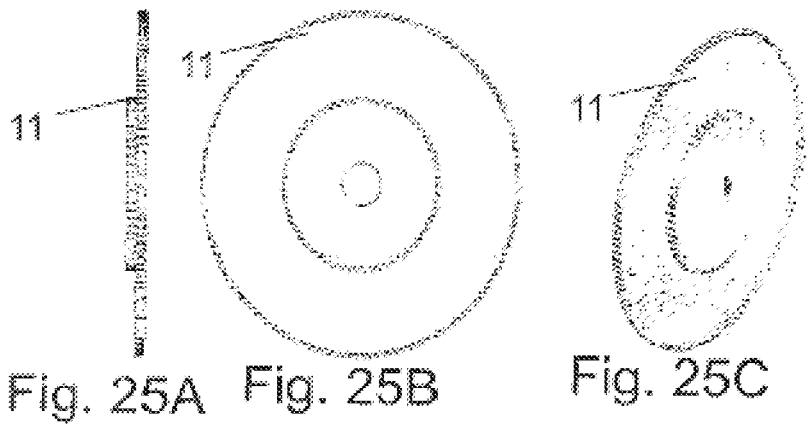
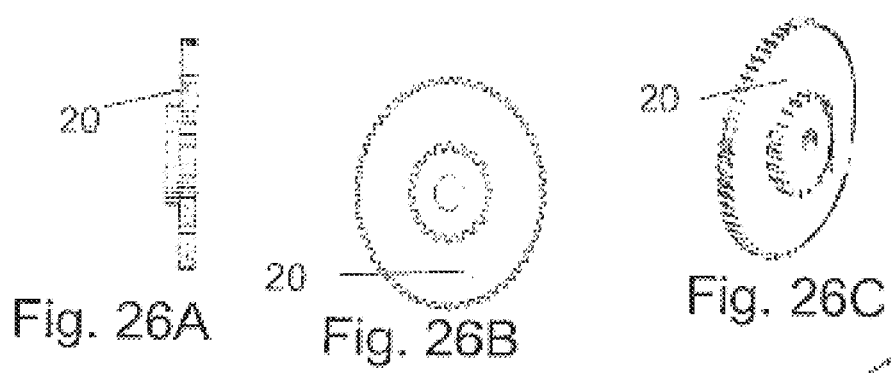
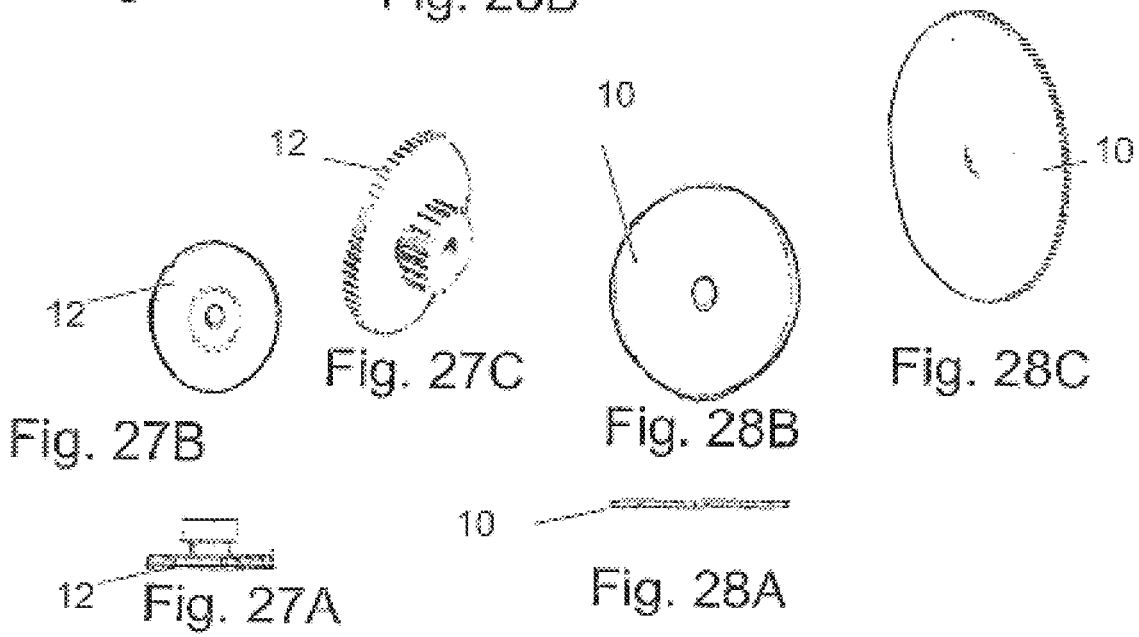
Fig. 25A  Fig. 25B  Fig. 25C
Fig. 26A  Fig. 26B  Fig. 26C
Fig. 27A  Fig. 27B  Fig. 27C  Fig. 28A  Fig. 28B  Fig. 28C

Fig. 29A
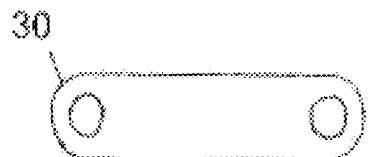
Fig. 29B
Fig. 29C
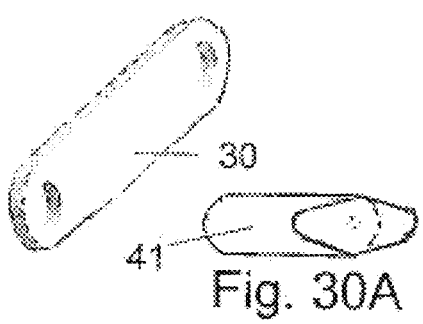
Fig. 30A
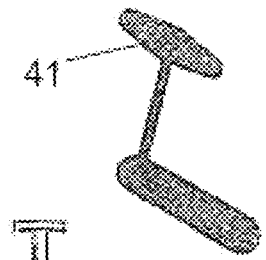
Fig. 30D
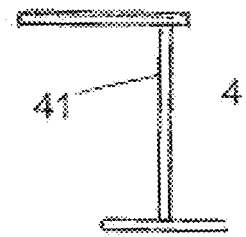
Fig. 30B
Fig. 30C
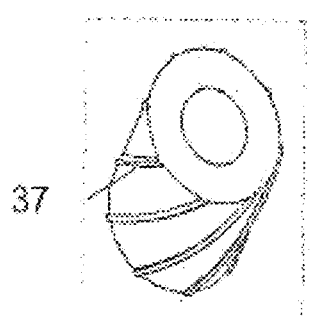
Fig. 31C
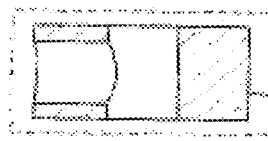
Fig. 32C
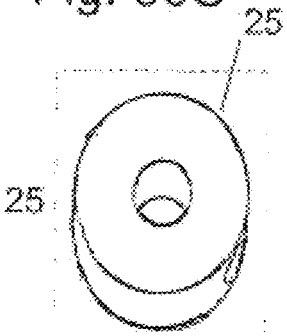
Fig. 32D
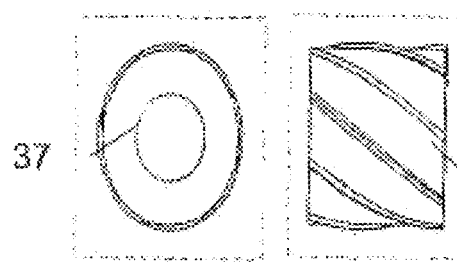
Fig. 31A  Fig. 31B
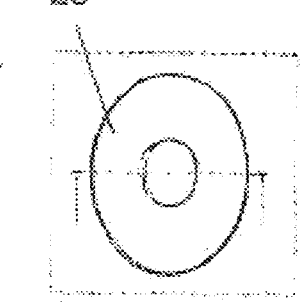
Fig. 32A
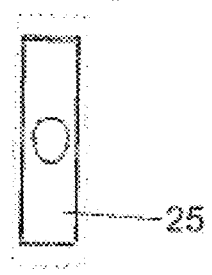
Fig. 32B

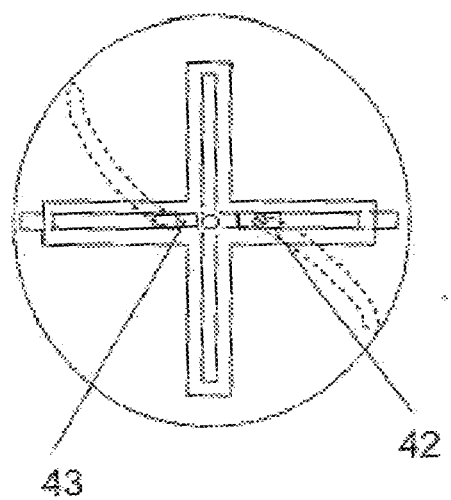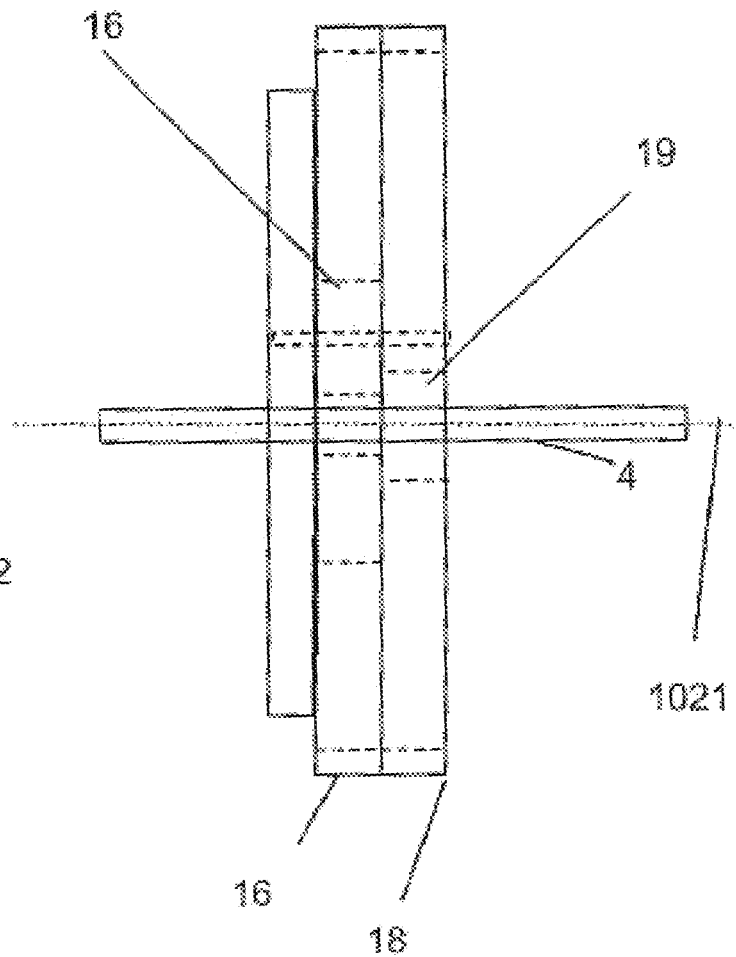
Fig. 45A
Fig. 45B

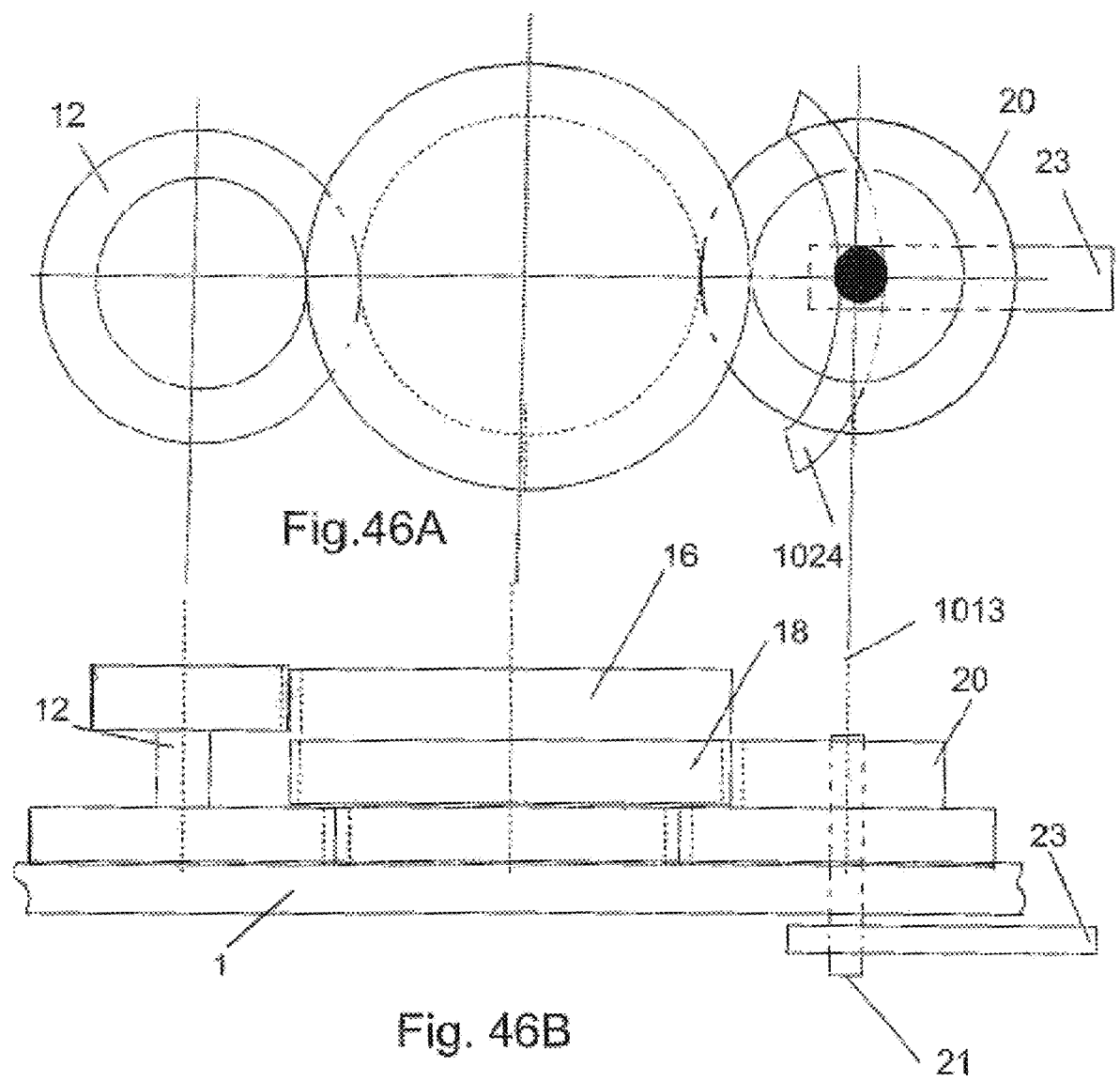

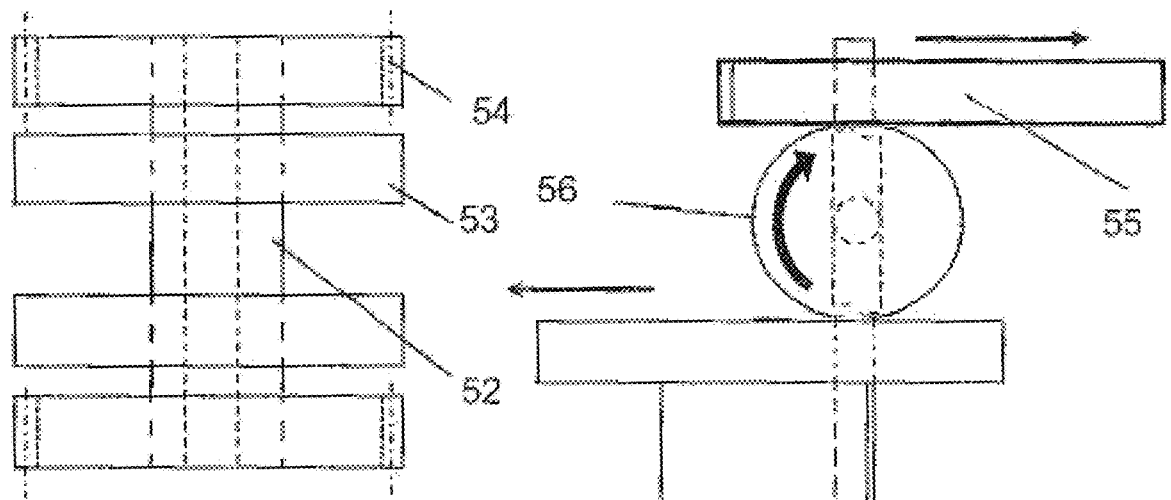
Fig. 60
Fig. 61
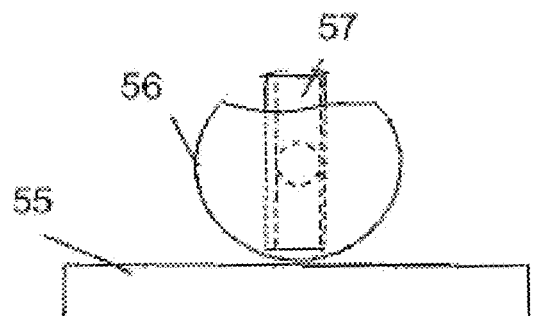
Fig. 62

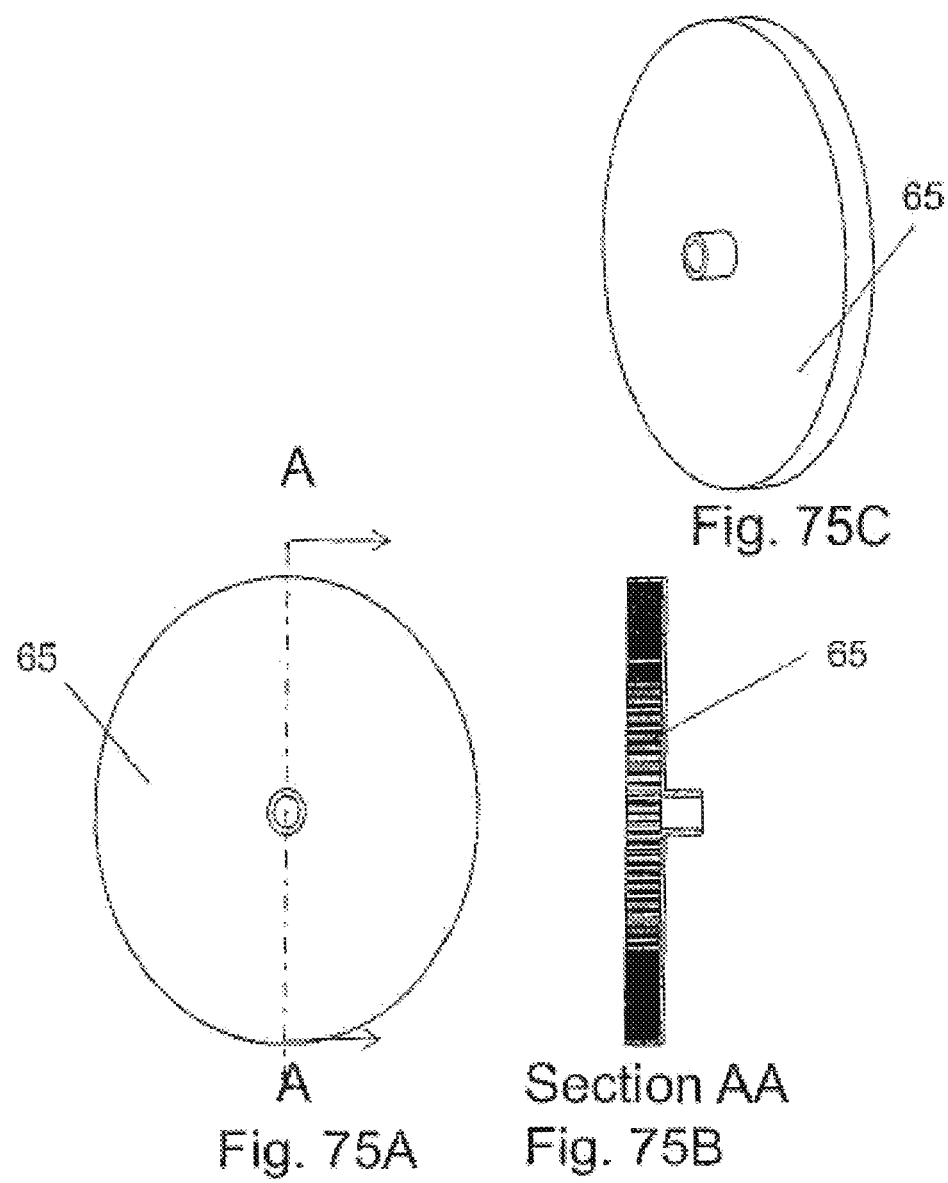

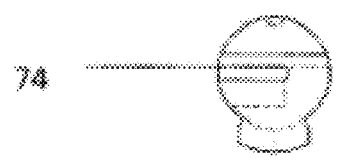
Fig. 93A
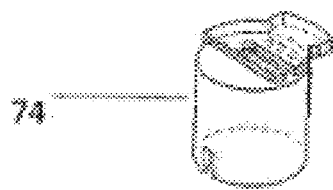
Fig. 93D
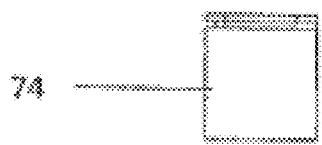
Fig. 93B
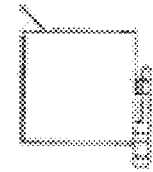
Fig. 93C
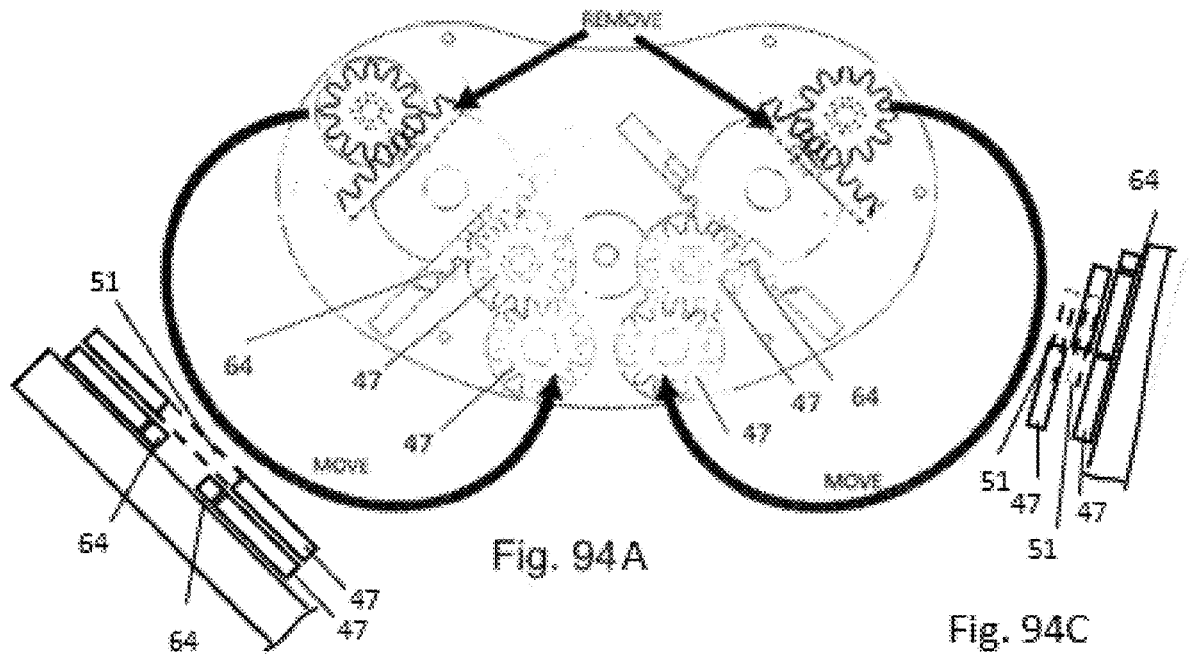
Fig. 94A
Fig. 94B
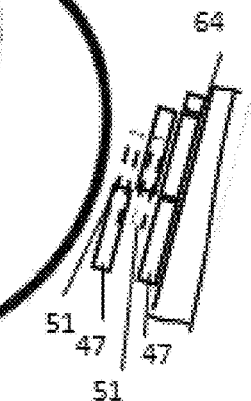
Fig. 94C

CONTINUOUSLY VARIABLE TRANSMISSION WITH UNIFORM INPUT-TO-OUTPUT RATIO THAT IS NON-DEPENDENT ON FRICTION

CROSS REFERENCE TO RELATED APPLICATIONS

Provisional Application
Application Number: 61788563

BACKGROUND OF THE INVENTION

Field of the Invention

This invention pertains to transmissions having variable ratios between input and output velocities. Specifically, it relates to all-gear transmissions whose velocity ratios may be changed continuously over a wide range of values, without depending on friction.

Description of the Related Art

The U.S. Pat. No. 5,603,240 and US 20100199805 use some of the features used in this design. The advantages in this invention include:

The U.S. Pat. No. 5,603,240 does not have a co-axial input to output and therefore cannot be used for applications requiring this configuration. The output travels as the ratio is changed. Therefore, this design cannot be used when stationary output is required. This new invention offers a stationary and co-axial input and output shaft. The envelope used in this invention is comparably smaller than that of the prior art.

US 20100199805 offers a sinusoidal output and uses several modules just to minimize the "ripple" when a steady and uniform input is provided. Therefore, the design cannot be used when a steady and uniform output is desired. This new invention offers a steady and uniform output when the input is steady and uniform. This can be achieved with as few as three modules namely Rectifier-Modules. (FIG. 87). This is explained in detail in the subsequent paragraphs.

BRIEF SUMMARY OF THE INVENTION

The main objective of this invention is to provide a UNIFORM and STEADY output, when the input is uniform and steady, with the ability to transmit high torque without depending on friction or friction factor. Many of the continuously variable transmissions that are in the market today are friction dependent and therefor lack the ability to transmit high torque. Those continuously variable transmissions, which are non-friction dependent do not have a uniform and steady output when the input is uniform and steady. This design aids reduction in the overall size and can be economically mass produced. This design can be easily integrated into any system. This design is very versatile and can be used ranging from light duty to heavy duty applications. This design allows replacement of existing regular transmission, requiring very little modification. This design offers stationary and co-axial input and output.

BRIEF DESCRIPTION OF THE SEVERAL VIEWS OF THE DRAWINGS

FIG. 10A through 10G—Cross rack assembly showing two perspective views and orthographic views showing details of the input shaft slot 1012 and the crank pin slot 1013, orientation of the racks and details of the prongs:
   10A—Top view
   10B—Perspective view
   10C—Perspective view
   10D—Front view
   10E—Side view
   10E—Rear view
   10G—Enlarged view showing details of the prong.

FIG. 11A through 11D—Pinion 47:
   11A—Front view
   11B—Side view 11C—Top view
   11D—Perspective view FIG. 12A through 12C—Pinion shaft 48: 12A—Front view
   12B—Side view
   12C—Perspective view FIG. 13A through 13C—Crank pin retainer 71: 13A—Front view
   13B—Side view
   13C—Perspective view FIG. 14A through 14C—Input disk 16: 14A—Front view
   14B—Side view FIG. 15 A through 15C—Gear changing lever planetary mechanism:
   15A—Front view
   15B—Top view
   15C—Perspective view FIG. 16—Compression spring 39 Perspective view.

FIG. 28A through 28C—Intermediate circular gear C1 10:
28A—Front view
28B—Top view
28C—Perspective view
FIG. 29A through 29C—Spacer used to keep two axes separated by a specific distance:
29A—Top view
29B—Front view
29C—Perspective view
FIG. 30A through 30D—gear changing lever for spiral flute mechanism:
30A—Top view
30B—Front view
30C—Top view
30D—Perspective view
FIG. 31A through 31C—spiral flute collar:
31A—Front view
31B—Side view
31C—Perspective view
FIG. 32A through 32D—Stationary differential collar 25:
32A—Front View
32B—Side view
32C—Section view
32D—Perspective view
FIG. 33A through 33D Dynamic differential collar—31:
33A—Front view
33B—Side view
33C—Section view
33D—Perspective view
FIG. 34—Input bevel sleeve perspective view:
FIG. 35—Crank pin 42 closer to the longitudinal axis and input disk 16 at 0°

FIG. 36—Crank pin 42 closer to the longitudinal axis and input disk 16 at 45°
FIG. 37—Crank pin 42 closer to the longitudinal axis and input disk 16 at 90°
FIG. 38—Crank pin 42 at midpoint and input disk 16 at 0°
FIG. 39—Crank pin 42 at midpoint and input disk 16 at 45°
FIG. 40—Crank pin 42 at midpoint and input disk 16 at 90°
FIG. 41—Crank pin 42 farthest from the gear and input disk 16 at 0°
FIG. 42—Crank pin 42 farthest from the gear and input disk 16 at 45°
FIG. 43—Crank pin 42 farthest from the gear and input disk 16 at 90°
FIG. 44—Perspective view showing input modification. Details showing arrangements and gear train of non-circular gears and intermediate gears from input shaft 4 to input disk 16.
FIG. 45A through 45B—Ratio cam disk 18, input disk 16 and crank pin 42 showing operation behind how the cam alters the crank pin 42 location
FIG. 45A—Top View
FIG. 45B—Side View
FIGS. 46A and 46B—Views showing working of planetary gear changing mechanism:
FIG. 46A—Top View
FIG. 46B—Side View
FIG. 47—Front view showing planetary gear changing mechanism. The main frame is made transparent for clarity.
FIG. 50—Differential mechanism (partially sectioned) view 1.
FIG. 51—Differential mechanism (partially sectioned) view 2.
FIG. 52—Differential mechanism (partially sectioned) view 3.
FIG. 53—Differential mechanism (partially sectioned) view 4.
FIG. 54—Differential mechanism (partially sectioned) view 5.
FIG. 55—Differential mechanism (partially sectioned) view 6.
FIG. 57 A—Isometric View
FIG. 57B—Top View
FIG. 58—Exploded view of One way bearing assembly (Pinion partially sectioned showing interior details).
FIG. 60—Power link assembly.
FIG. 61—Assembly showing concept of vibration cancelation.
FIG. 62—Vibration cancellation mechanism: sub-assembly.

FIG. 63 Non-circular gear placed at 135°

FIG. 64 Non-circular gear placed at 45°

FIG. 65 Non-circular gear placed at (−) 45°

FIG. 66 Non-circular gear placed at (−) 135°

FIG. 67—Assembly orientation of individual rectifier modules.

FIG. 68—Graph showing individual rack movement function (output at each rack) for the non-linear option 1004 and combined total output showing constant and uniform output with overlaps. Horizontal axis shows the angle of rotation of the driven non-circular gear 9. Vertical axis shows the rack speed.

It is also showing the linear option 1003 for one of the rectifier modules 1001 as well as angular position of the driven non-circular gear 9 where it switches from non-functional region 1005 to function region 1017.

Figure 69:
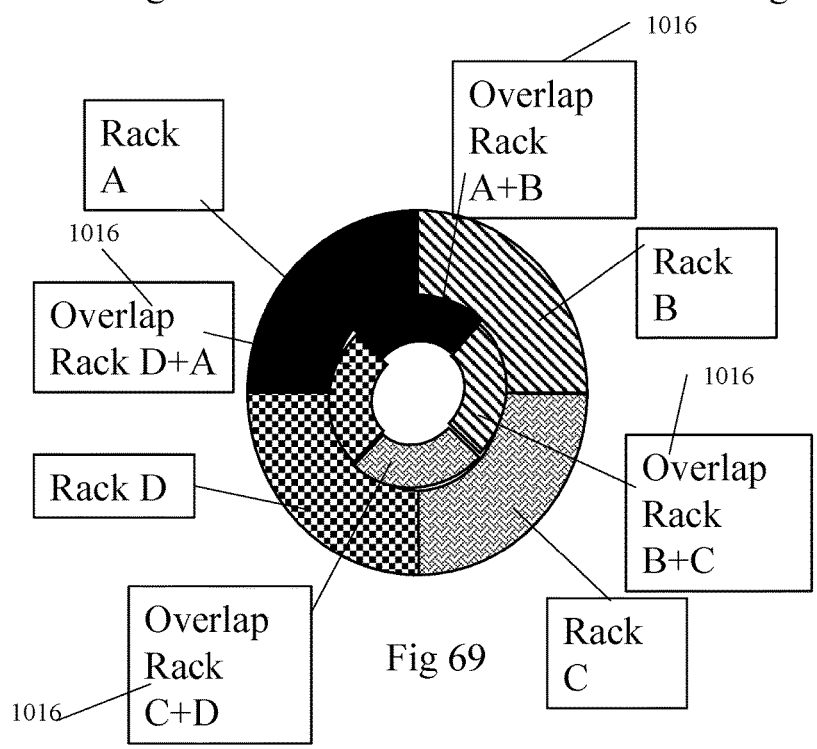

FIG. 69—Graphical representation of output with overlaps and sequence of engagement for a complete cycle.

Figure 70:
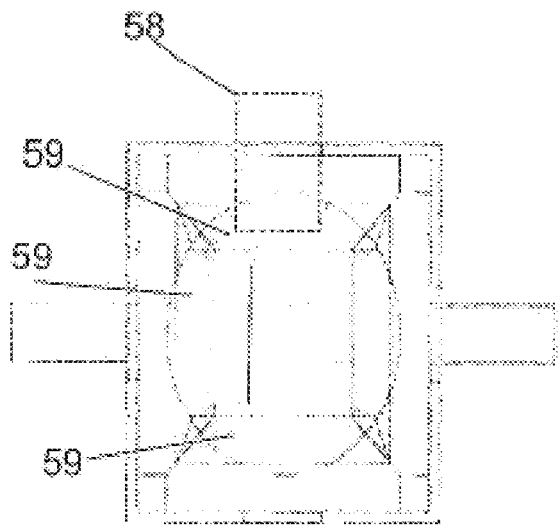

FIG. 70 thru 73—Miter/bevel gear assembly describing forward, reverse, neutral and park gears:

FIG. 70—Engagement of clutches for a forward gear.

Figure 71:
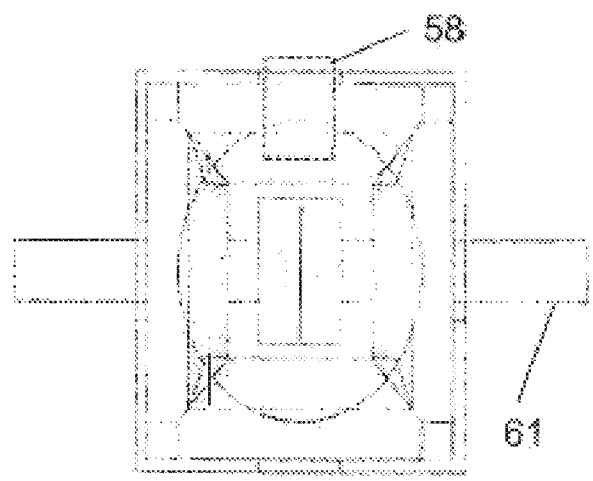
Figure 72:
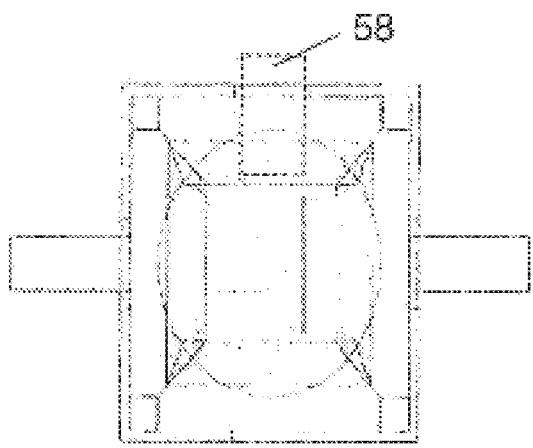
Figure 73:
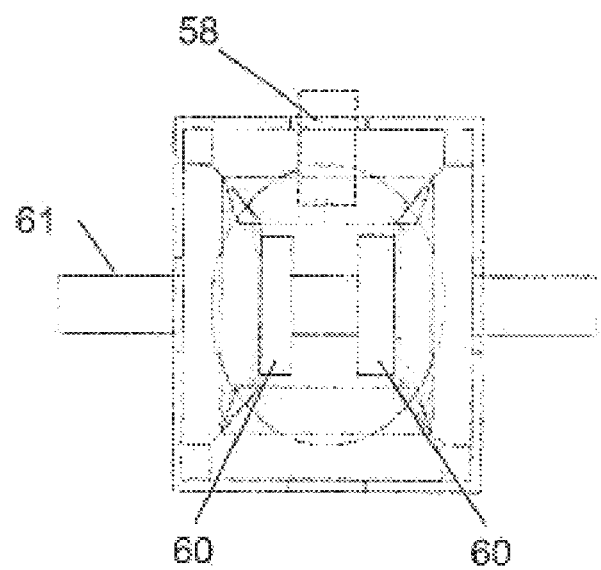

FIG. 71—Engagement of clutches for a reverse gear. FIG. 72—Engagement of clutches for a neutral gear. FIG. 73—Engagement of clutches for "Park".

Figure 74A:
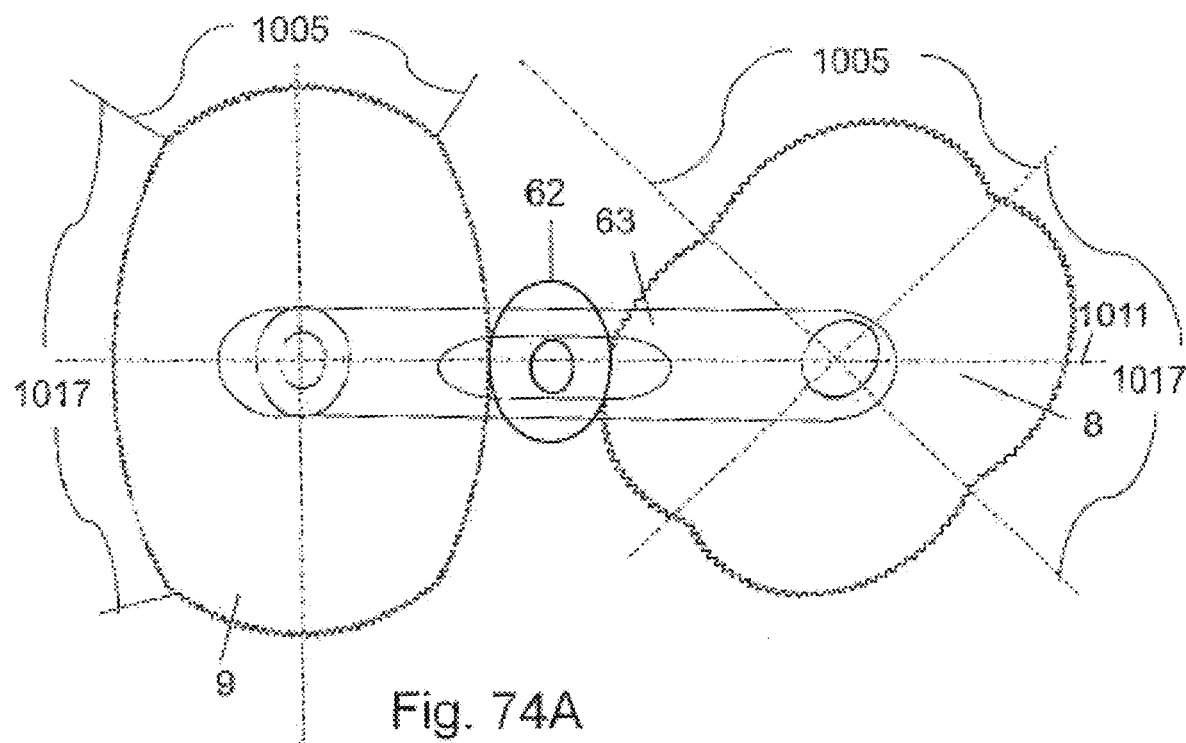
Figure 74B:
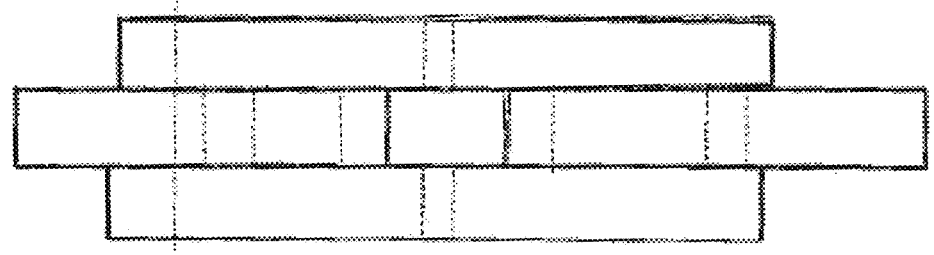

FIGS. 74A and 74B—Concept of using of intermediate gear to eliminate multiple contacts between non-circular gears:

74A—top view

74B—front view

FIG. 75A through 75C—Co-axial output element:

75A—Front view

75B—Section side view

75C—Perspective view

Figure 76:
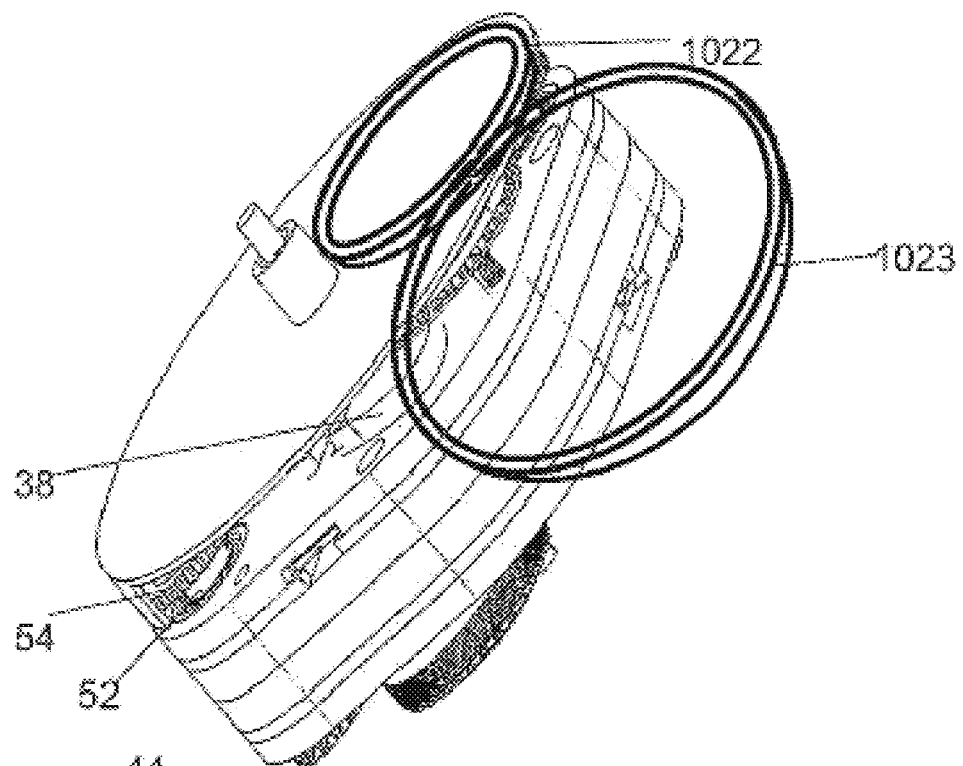

FIG. 76—Detail showing arrangement of co-axial output member in the assembly

Figures 77, 78:
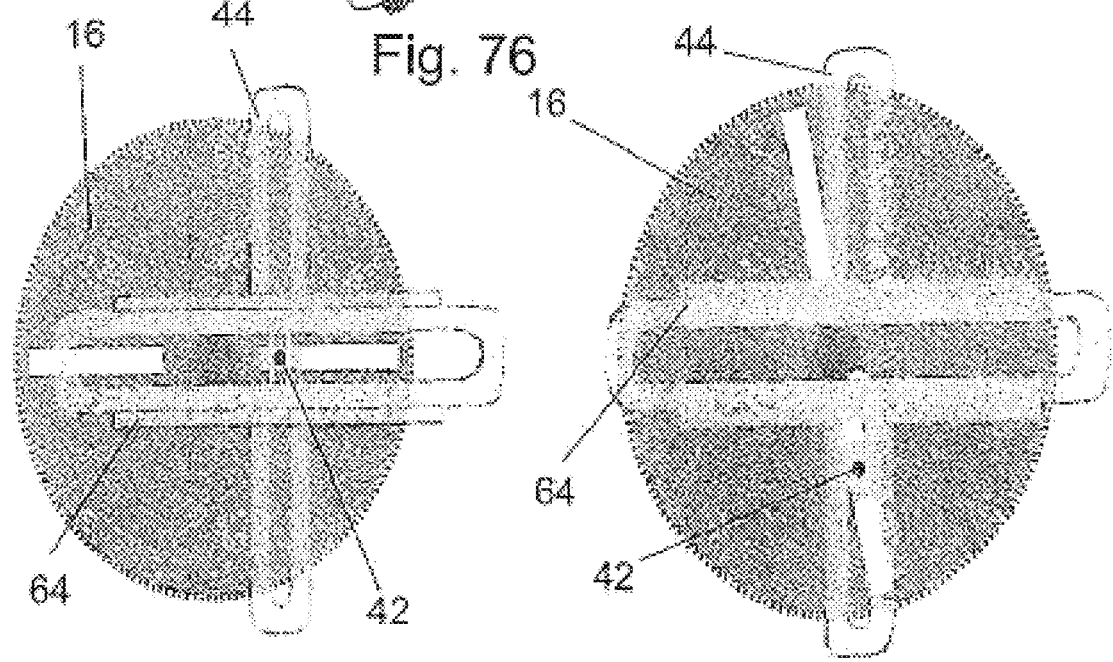

FIG. 77—Crank pin 42 and the crank pin retainer 71 when they are in the middle of input slot.

FIG. 78—Crank pin 42 and the crank pin retainer 71 as it exits the input slot.

Figure 79:
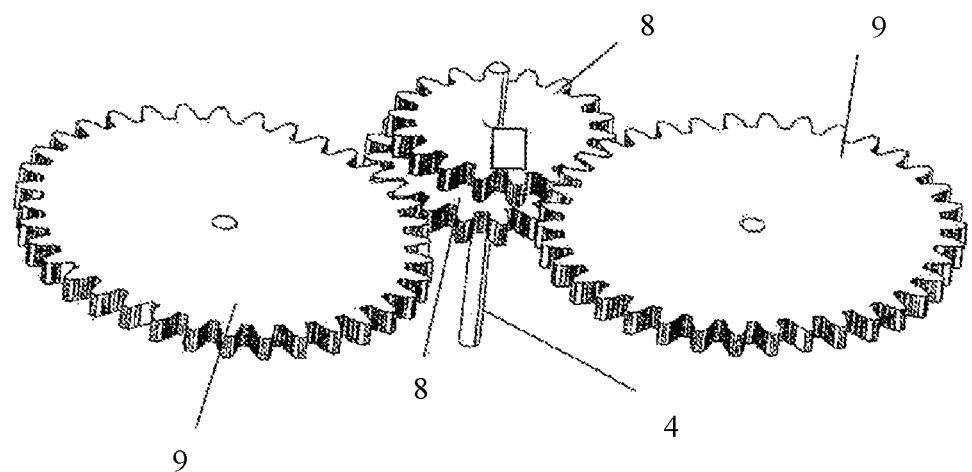

FIG. 79—Multiple driving non-circular gears 8 and driven non-circular gears 9 are stacked in 2 layers and the sum of all the active functional portions of the two non-circular gears pairs is 2: 360°.

FIG. 80A through 80D—Sliding collar link gear changing mechanism

80A—Top View

80B—Left View

80C—Front View

80D—Isometric View

80E—Bottom View

FIG. 81A through 81D—Optional sliding collar link gear changing mechanism

81A—Top View

81B—Front View

81C—Right View

81D—Isometric View

Figures 81A, 81B, 81C, 81D, 82:
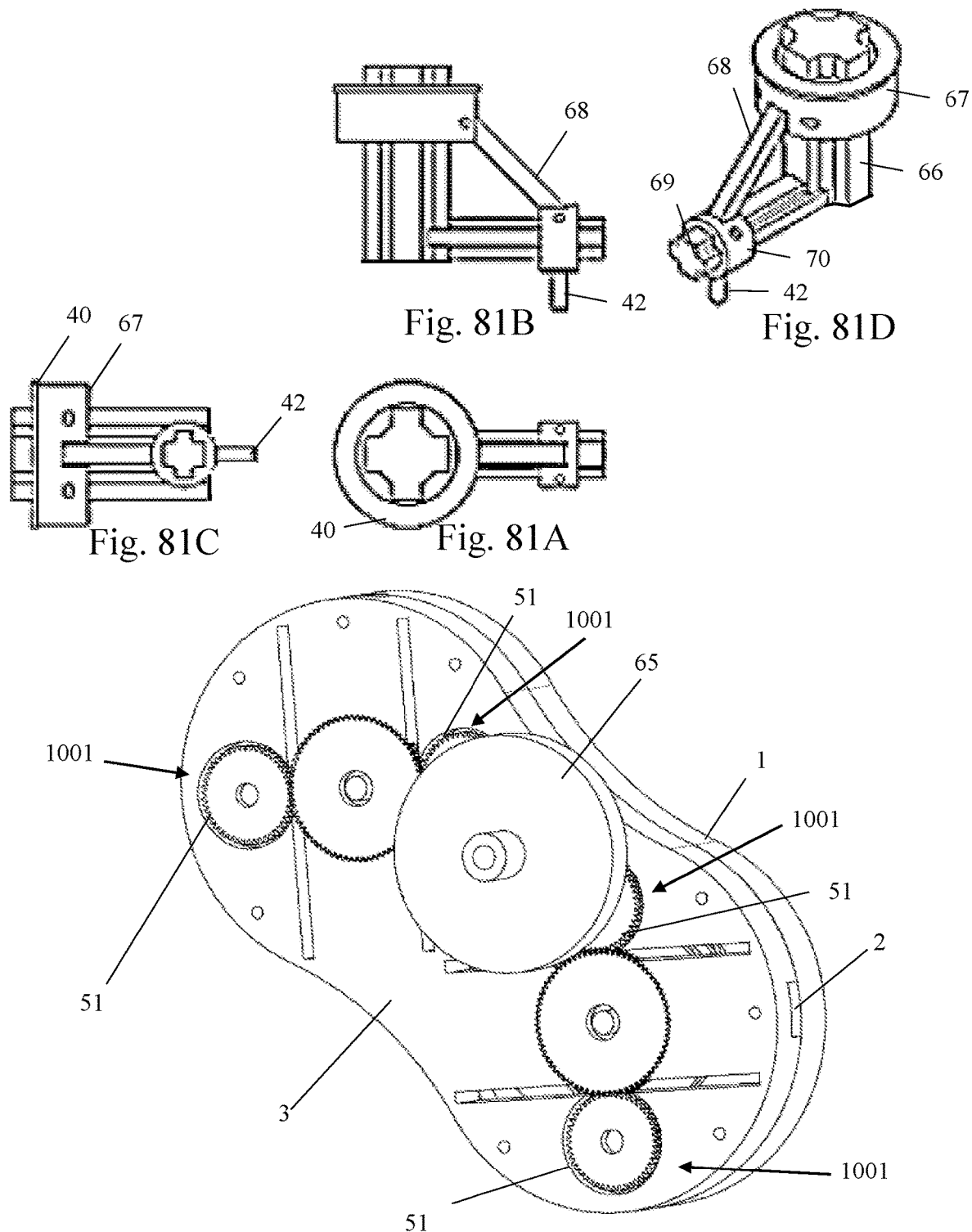

FIG. 82—Alternate CVT assembly configuration—"Siamese" configuration showing all the 4 rectifier modules 1001 are on the same side of the CVT.

Figure 83:
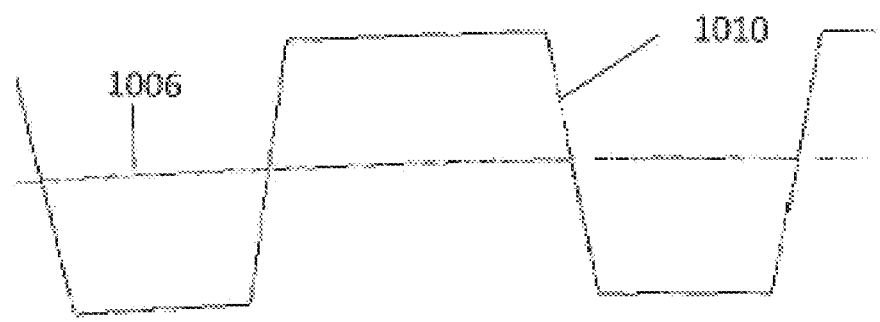

FIG. 83—A portion of the pitch curve and gear teeth profile of a gear

Figure 84:
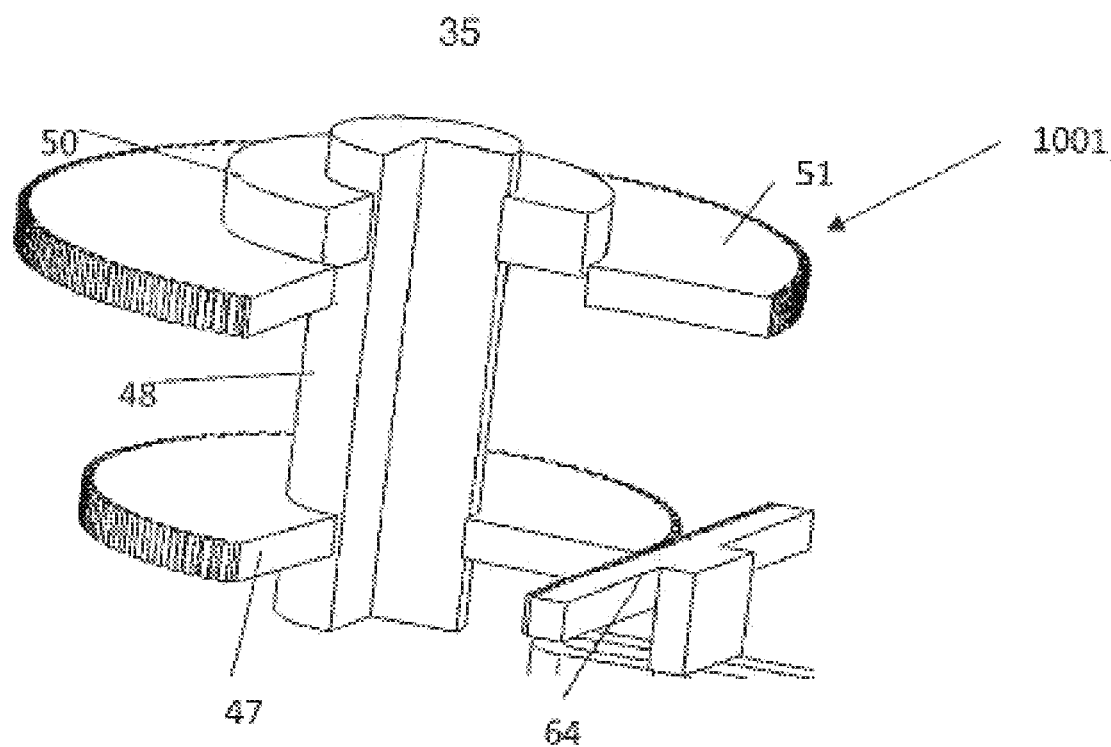

FIG. 84—Rectifier module where components are sectioned to show detail including rack 64, pinion 47, one way bearing 50, pinion shaft 48 and output sprocket/output gear 51

Figure 85:
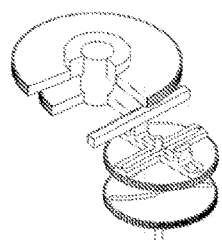

FIG. 85—Scotch yoke module

Figure 86:
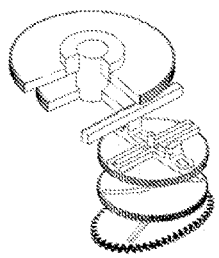

FIG. 86—Scotch yoke module with driven non-circular gear 9

Figure 87:
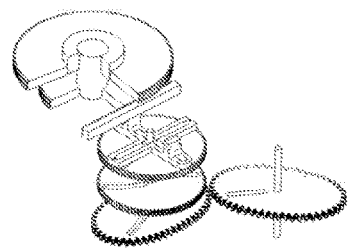

FIG. 87—Angular velocity module with Scotch yoke module

Figure 88:
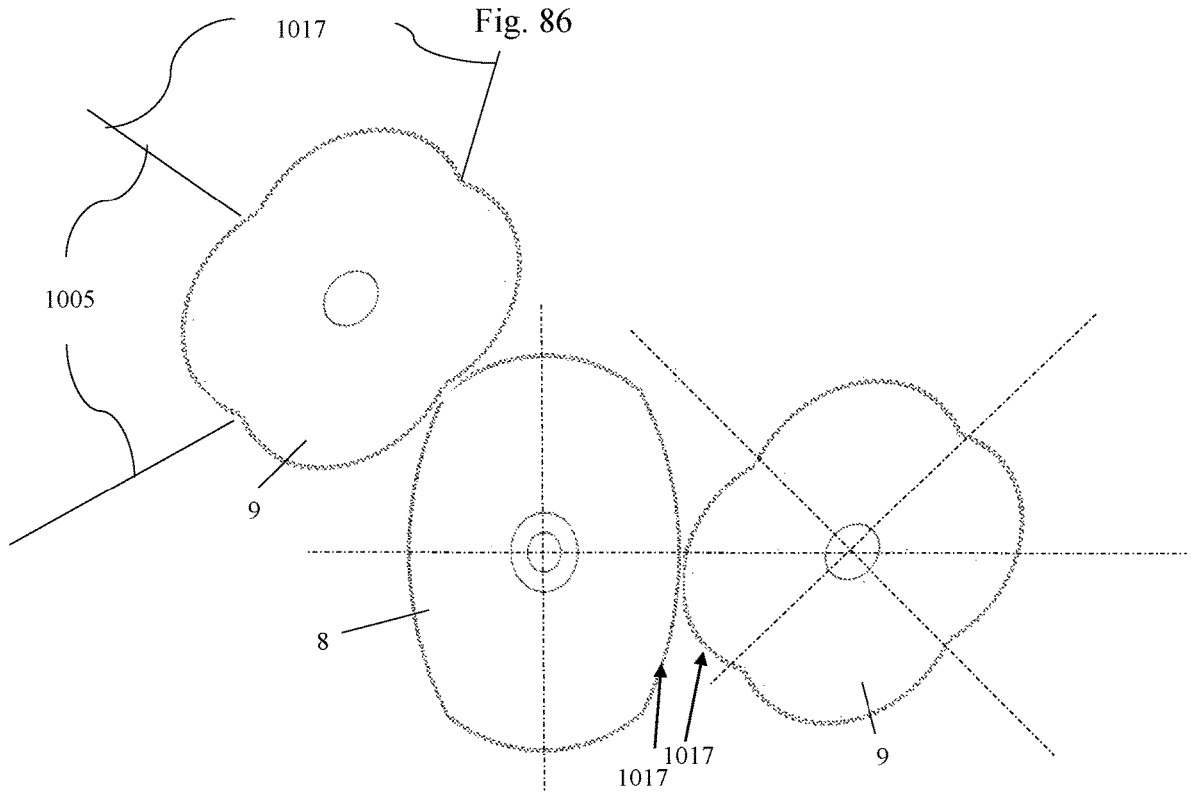

FIG. 88—Two Angular velocity modifier module sharing the same driving non-circular gear 8

Figure 4:
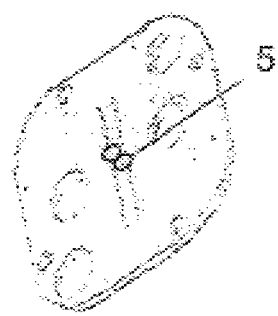
FIG. 4—Cross rack holder frame 2 perspective view.
Figure 5:
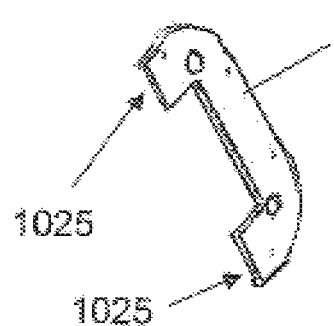
FIG. 5—Telescopic guide frame 3 perspective view.
Figures 89, 90:
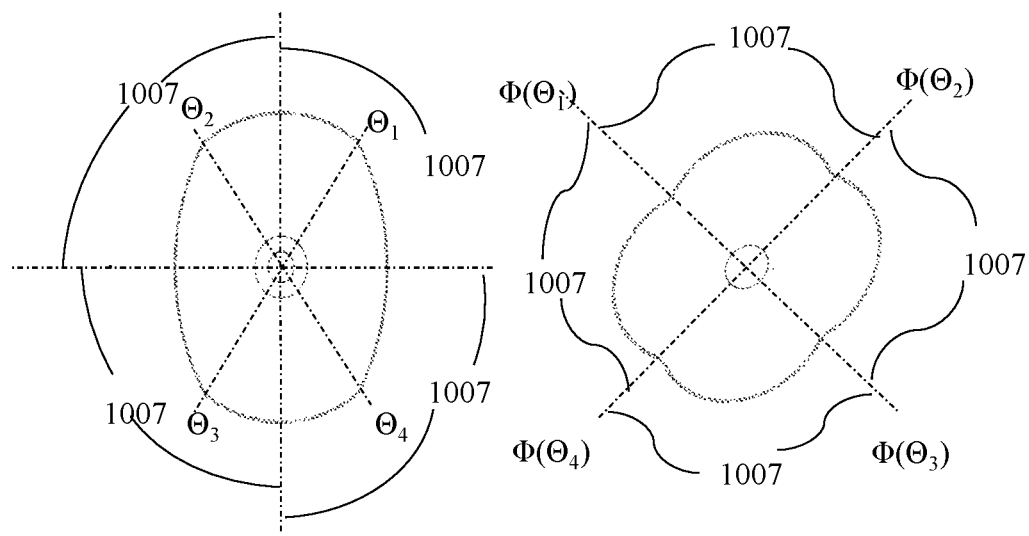

FIGS. 89 and 90—4 parts of each of the non-circular gears that can be derived by mirroring each other 89—Driving non-circular gear 8

90—Driven non-circular gear 9

Figures 91, 92:
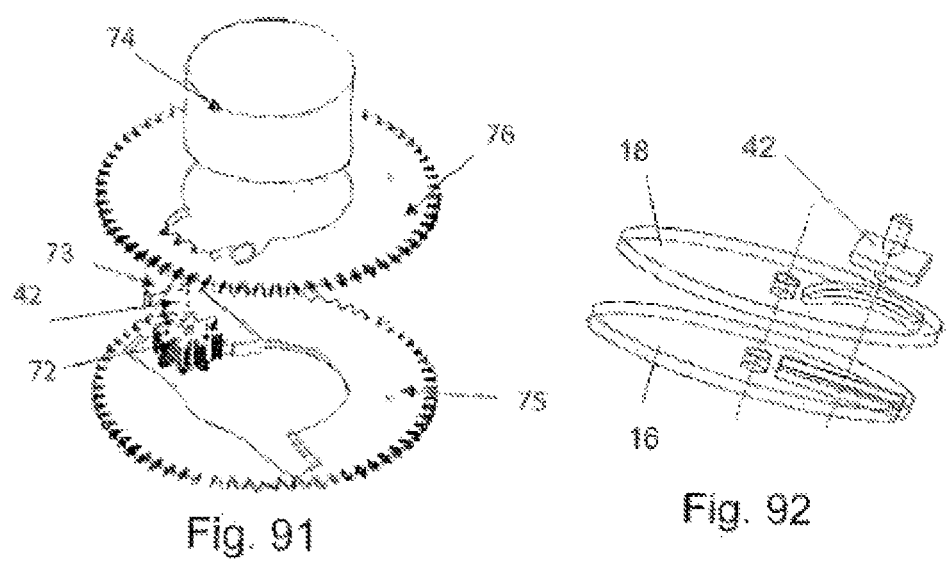
Figure 95A:
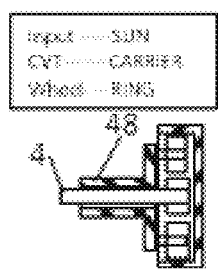
Figure 95B:
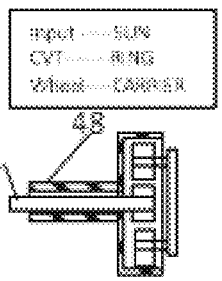
Figure 95C:
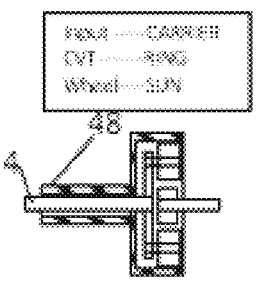
Figure 95D:
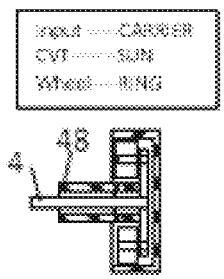
Figure 95E:
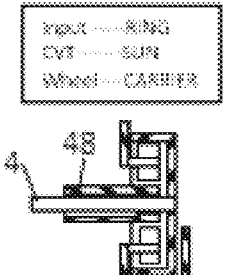
Figure 95F:
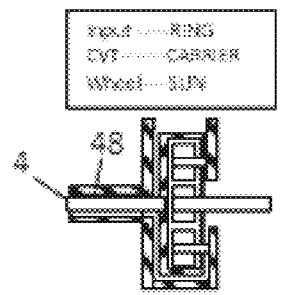

FIG. 91—Alternative method of changing crank pin 42 position with crank pin axis 1029 on the Rack FIG. 92—Alternative method of changing crank pin 42 position with crank pin axis at the intersection of the slots of the input disk 16 and ratio cam disk 18

FIG. 93A through 93D—Notched Input Shaft

93A—Front View

93B—Top View

93C—Side View

93D—Isometric View

Figure 96:
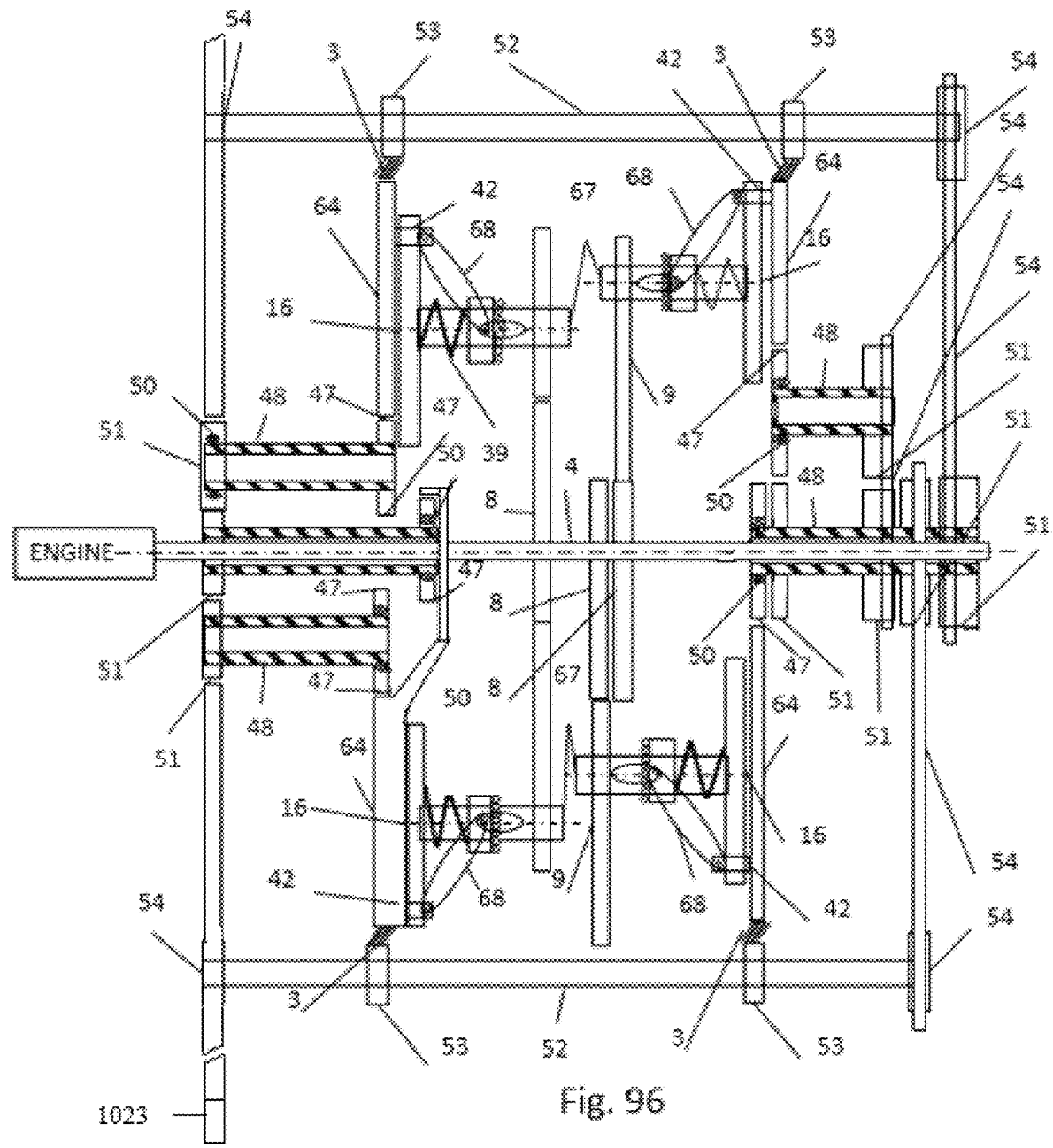

FIG. 94A-94C—Drawing showing way to achieve two rectifier modules using a common rack and a pinion 94A—Top View 94B—Auxiliary View before the move of the pinion from one side to another and removing one rack in each module 94C—Auxiliary View after the move of the pinion from one side to another and removing one rack in each module FIG. 95A-F—All possible combinations of connecting the input and output from the CVT/IVT and the wheel to a planetary gear system 95A—Input: Sun CVT: Carrier Wheel: Ring 95B—Input: Sun CVT: Ring Wheel: Carrier 95C—Input: Carrier CVT: Ring Wheel: Sun 95D—Input: Carrier CVT: Sun Wheel: Ring 95E—Input: Ring CVT: Sun Wheel: Carrier 95F—Input: Ring CVT: Carrier Wheel: Sun FIG. 96—This drawing combines the concept of achieving two rectifier modules with one common rack (as shown in FIG. 94) and all the possible combinations for placing all the modules (shown in drawings FIGS. 58, 60, 76, 84, and 94 for the placement of one-way bearing) and also co-axial input shaft and output gear/output sprocket (with a pinion shaft co-axial to input shaft).

DETAILED DESCRIPTION OF THE INVENTION

Summary of the Invention

To briefly describe this invention is a Continuously Variable Transmission (CVT). Unlike existing CVT designs, this particular design does NOT depend on friction to transmit power. Most of the CVTs that exist today depend on friction to transmit power and therefore cannot be used where there is a need to transmit high power at low speed. Due to this advantage, it is possible to use this invention where high torque transmission is required. Co-axial input and output can be achieved with this layout.

LIST OF COMPONENTS

1) Main housing frame

2) Cross rack holder frame

Figure 6:
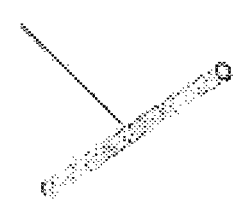
FIG. 6—Input shaft 4 perspective view.

3) Telescopic guide frame
4) Input shaft
5) Input shaft bearing
6) Intermediate gear shaft
7) Intermediate gear shaft bearing
8) Driving non-circular gear
9) Driven non-circular gear
10) Intermediate circular gear c1
11) Intermediate circular gears c2 c3
12) Intermediate circular gears c4 c5
13) Bearing collar
14) Circular gear c2 c3 bearing
15) Circular gear c4 c5 bearing
16) Input disk
17) Input disk bearing
18) Ratio cam disk
19) Ratio cam disk bearing
20) Intermediate circular gears C4a-C5a
21) Carrier shaft
22) Carrier shaft bearing
23) Planetary mechanism ratio changing lever
24) Input disk sleeve
25) Stationary differential collar
26) Stationary differential collar spur gear shaft bearing
27) Stationary differential collar spur gear shaft bearing
28) a) Small bevel gear stationary differential collar
    b) Large bevel gear stationary differential collar
29) Stationary differential collar spur gear
30) Spur gear spacer
31) Dynamic differential collar
32) Bearing dynamic differential collar spur gear shaft bearing
33) Dynamic differential collar spur gear shaft
34) a) Small bevel gear dynamic differential collar
    b) Large bevel gear dynamic differential collar
35) Dynamic differential collar spur gear
36) Universal joint
37) Spiral fluted collar
38) CVT output shaft
39) Compression spring
40) Thrust bearing
41) Ratio changing spiral flute mechanism lever
42) Crank pin
43) Dummy crank pin
44) Cross rack holder
45) Primary telescopic sleeve
46) Secondary telescopic sleeve
47) Pinion
48) Pinion shaft
49) Pinion bearing
50) Computer controlled clutch/one way Bearing/ratchet mechanism
51) Output gear/output sprocket
52) Power link shaft
53) Power link shaft bearing
54) Power Link Sprocket/Power Link Gear
55) Dummy rack
56) Vibration cancellation mechanism wheel collar
57) Vibration cancellation mechanism wheel collar
58) Miter/bevel gear shaft
59) Miter/bevel gear
60) Park/neutral/reverse clutch
61) Miter/bevel gear differential output shaft
62) Intermediate non-circular gear connector
63) Intermediate non-circular gear connector guide
64) Rack
65) Co axial output element with internal gear/planetary gear
66) Auxiliary input shaft
67) Auxiliary input shaft sliding collar
68) Link
69) Crank pin shaft
70) Crank pin shaft collar
71) Crank pin retainer
72) Crank pin rack spur gear
73) Crank pin rack
74) Notched input shaft
75) Modified input disk
76) Modified ratio cam The working of this CVT can be described by the following simple sequential operations.

a) A crank pin 42 (FIG. 45A), revolves around the longitudinal axis 1021 of an input disk 16 (FIG. 14) or a input shaft 4 (FIG. 6) or an auxiliary input shaft 66 at an offset distance 1025 as shown in FIG. 80, and this offset distance can be altered. The offset distance ranges from zero to a non-zero value. The concept described in this operation exists in another patent application US 20100199805. However, here an entirely different approach is adapted on how this concept is used, how the offset is altered etc. in a much simpler, and in a compact envelop.

b) This offset crank pin 42 is caged in
  1) the input disk 16 or alternatively in a crank pin shaft collar 70 that slides on a crank pin shaft 69, and
  2) a slot of a cross rack holder 44 (FIG. 10).

The Cross rack holder 44 is restricted such that it can move only in the direction that is normal to its slot. A rack 64 is fastened to the cross rack holder 44, such that the rack 64 is parallel to the cross rack holder's 44 direction of movement. In the alternative construction, the crank pin shaft 69 is orthogonal to the input shaft 4. The revolution of the crank pin 42 about the longitudinal axis 1021 of input disk 16 is translated to pure linear back and forth movement or reciprocating movement of the rack 64. This mechanism is commonly known as "scotch yoke mechanism" in the industry. The distance of this linear back and forth movement (stroke) is directly proportional to the radial distance of the crank pin 42 from the longitudinal axis 1021 of the input disk 16.

Since the work done is constant, which is a product of force applied multiplied by the distance traveled (F* stroke), for a smaller stroke, the force applied is greater and for a longer stroke, the force applied is smaller.

c) The rack 64 is linked to a Pinion (FIG. 11) placed on a pinion bearing 49 converting this linear movement of the rack 64 to rocking oscillation of the pinion 47.

d) This rocking oscillation is converted to a unidirectional rotation, using a computer controlled clutch/one way bearing/ratchet mechanism 50.

One main purpose of this invention is to achieve a CONSTANT AND UNIFORM output angular velocity when the input angular velocity is constant and uniform. However, using the steps described above, this is NOT achieved, as the output is sinusoidal. By modifying the rate of change of angular displacement of the input disk 16, a uniform steady output can be achieved. By using a set of non-circular gears, the driving non-circular gear 8 (FIG. 22) and the driven non-circular gear 9 (FIG. 21), the instantaneous rate of change of angular displacement at the input disk 16 can be altered. The output from the driven non-circular gear 9 is then transferred to the input disk 16 via some Intermediate-Circular-Gears.

The design construction is grouped in to modules/mechanism for easier understanding: Detailed description of assembly, sub-assembly of components/modules and their functions:

a) Angular velocity modifier module (FIG. 87): The main purpose of this module is to change the uniform rate of power input to a reciprocal of sinusoidal output. This is to reverse the effect of the sinusoidal output in a scotch yoke mechanism. This module comprises of:
  1) Driving non-circular gear 8,
  2) Driven non-circular gear 9 and
  3) Input shaft 4
  The driving non-circular gear 8 is mounted on the input shaft 4. This drives the driven non-circular gear 9.

b) Scotch yoke module (FIG. 86): The main purpose of this module is to convert circular motion to a reciprocating motion. The output is sinusoidal for a steady, uniform input. This output is converted to a steady, uniform output using angular velocity modifier module.
  This scotch yoke module comprises of:
  1) input disk 16,
  2) cross rack holder 44, and
  3) crank pin 42
  The input disk 16 has a radial slot, with optionally geared profile 1010 on its perimeter. The ratio cam disk 18 (FIG. 20) placed in a ratio cam disk bearing 19 has non-radial slot from center to the periphery with a minimum wall thickness. Optionally the ratio cam disk 18 also has a geared profile 1010 on its perimeter with identical pitch curve as in the input disk 16. The input disk 16 and the ratio cam disk 18 are placed adjacent to each other. They are placed co-axial with respect to their longitudinal axes. The cross rack holder 44 has a slot namely "crank pin slot" 1013. It also has an extension on either side of the slot at the middle of the slot. This extension is normal to the crank pin slot 1013. This cross rack holder 44 optionally has another slot on this extension namely "input shaft slot" 1012. This slot is normal to the "crank pin slot" 1013. The purpose of this slot is to allow the option of input shaft 4 to pass through. The cross rack holder 44, is placed on the other side of the input disk 16 sandwiching the input disk 16 between the cross rack holder 44 and a ratio changing mechanism, which is described in subsequent paragraphs. The crank pin 42 passes through the slots of ratio changing mechanism, input disk 16, and cross rack holder 44 c) Rectifier module: The main purpose of this module is a mechanical equivalent to a diode in an electrical circuit. It allows power transfer to one specific direction.
  1) Rack 64,
  2) Pinion 47,
  3) Pinion shaft 48,
  4) Computer controlled clutch/one way bearing/ratchet mechanism 50 and
  5) Output gear/output sprocket 51
  The Rack 64 is attached to the Cross rack holder 44 normal to the crank pin slot 1013 and paired with the Pinion 47. The Pinion 47 is mounted on a pinion shaft 48. The computer controlled clutch/one way bearing/ratchet mechanism 50 is mounted on the pinion shaft 48. The output gear/output sprocket 51 is mounted on the OD of the Computer controlled clutch/one way bearing/ratchet mechanism 50.
  An alternative way to achieve two rectifier module using a common Rack 64 a Pinion 47 and a pinion shaft 48 is to use two Output gear/output sprocket 51 on the common pinion shaft 48 with the Output gear/output sprocket 50 to effective in opposite directions.
  It is possible to use a common rack 64 for two rectifier module which are phased 180° apart, by directly pairing one Pinion 47 that is paired with the Rack 64 in one Rectifier-Module with another Pinion 47 of another rectifier module which is phased at 180° and thereby eliminate the need for the additional Rack 64 in one of the two rectifier module. (FIG. 94)

d) Gear changing mechanisms: One of four different mechanisms are used on each scotch yoke module here namely
  1) Planetary mechanism,
  2) Spiral flute mechanism,
  3) Differential mechanism, and
  4) Link mechanism
  The Planetary mechanism, spiral flute mechanism and the differential mechanism mainly use the relative rotation of input disk 16 and the ratio cam disk 18 where the relative rotation is controlled by a synchronous control mechanism. This relative rotation is used by a crank pin displacement mechanism to achieve translation of the crank pin 42 radially. Link mechanism uses the axial motion of a non-rotating disk and an axially stationary rotating disk. This relative motion is used by a suitable mechanism to achieve translation of the crank pin 42 radially. The construction details and the working of these mechanisms are discussed in detail in the subsequent paragraphs.

Figure 9:
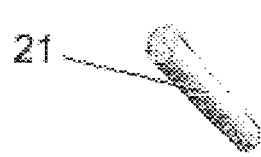
FIG. 9—Carrier shaft 21 perspective view.
Figure 15A:
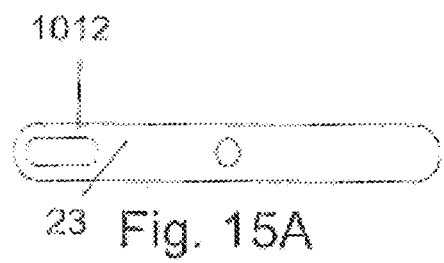
Figure 37:
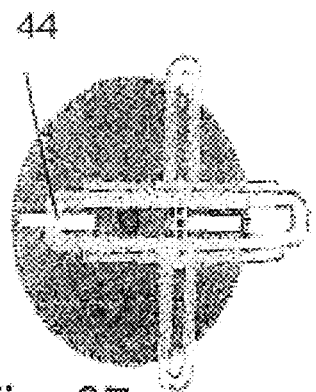
Figure 38:
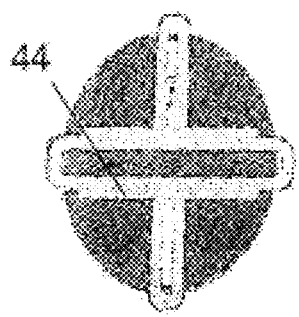
Figure 39:
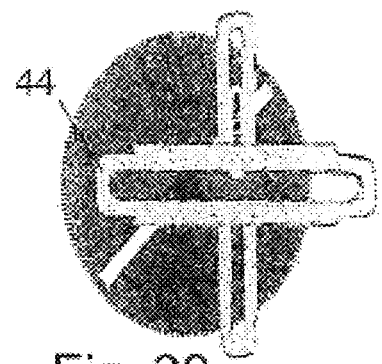
Figure 40:
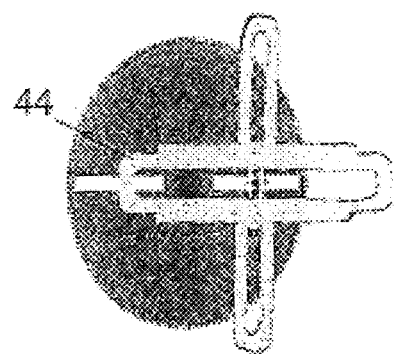
Figure 41:
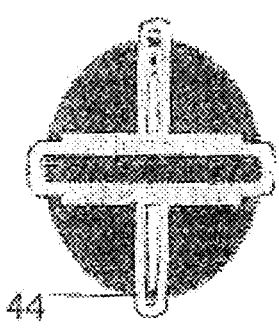
Figure 42:
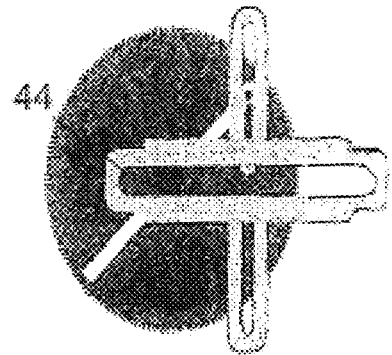
Figure 43:
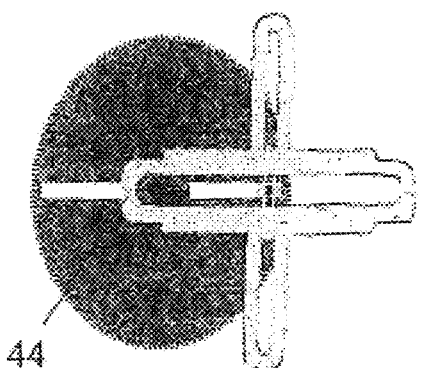

Operating principle of the gear changing mechanisms (methods to change ratio):

1) Planetary mechanism,
  A set of intermediate circular gears c4a c5a 20 (FIG. 26), where the gears C4a and C4b are axially connected, is mounted on a common Carrier shaft 21 (FIG. 9) on a carrier shaft bearing 22. C4a has identical pitch curve to the circular gear's C4 pitch curve and C5a has identical pitch curve to the circular gear's C5 pitch curve. The movement of this longitudinal axis of the intermediate circular gears C4a-05a 20 is restricted to a circular slot/path namely main housing slot 1024, which is at a constant distance from the longitudinal axes of the input disk 16 and the ratio cam disk 18, while the longitudinal axis of intermediate circular gears C4-C5 12 mounted on a circular gear c2 c3 bearing 15 is stationary. The gear C4a is radially connected to gear C3 and the gear C5a is radially connected to the ratio cam disk 18. The gear C4 is radially connected to gear C3 and the gear C5 is radially connected to the input disk 16. A planetary mechanism ratio changing lever 23 (FIG. 37) pivoted on the frame enables the location of the carrier shaft 21 to move along the main housing slot. While the location is being displaced, there is a relative angular displacement between the input disk 16 and the ratio cam disk 18.

Figure 56:
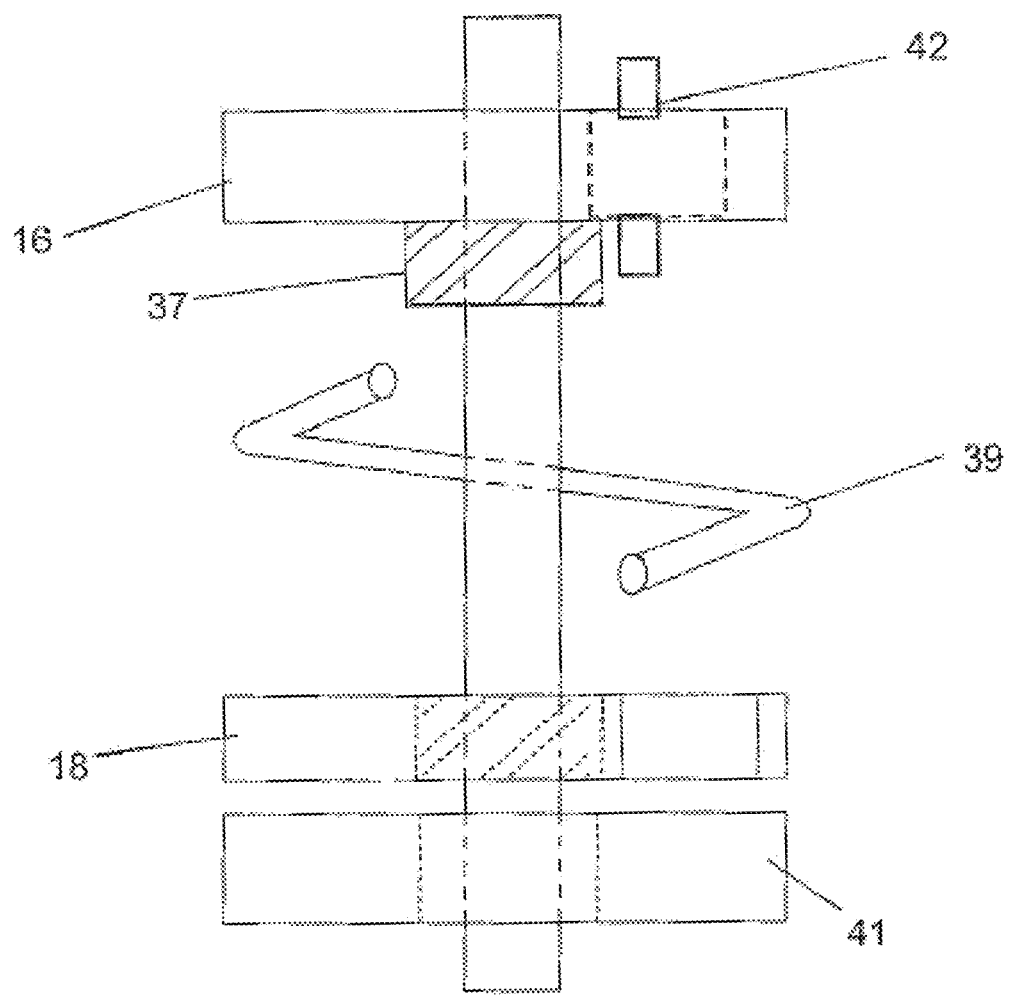
FIG. 56—Assembly showing working of gear changing mechanism spiral flute mechanism (exploded).
Figure 57A:
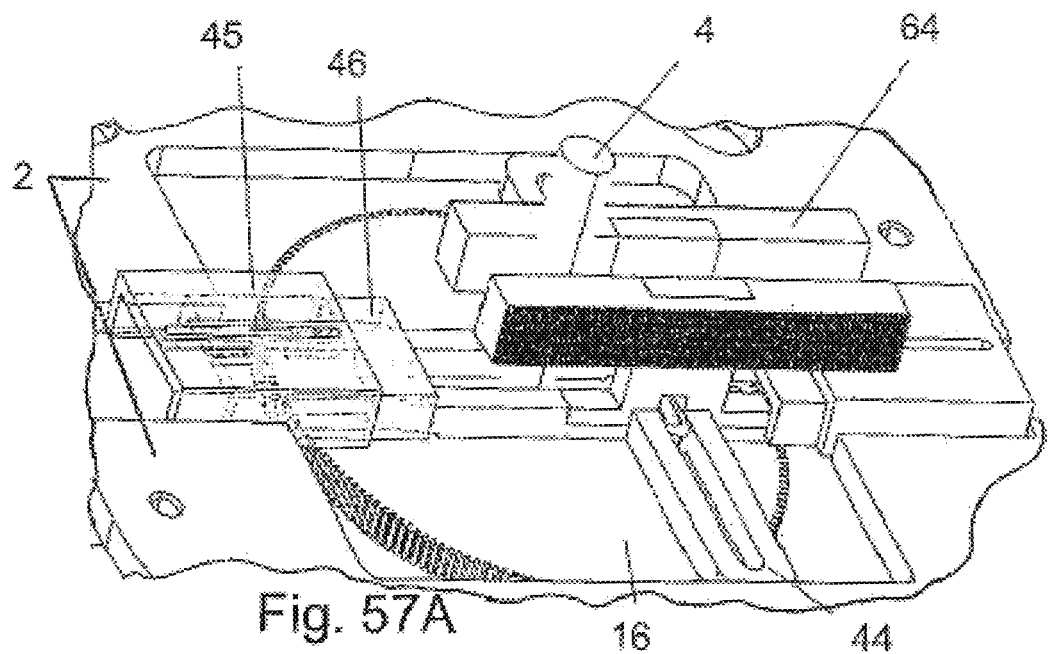
FIGS. 57A and 57B—Telescopic Guide.
Figure 57B:
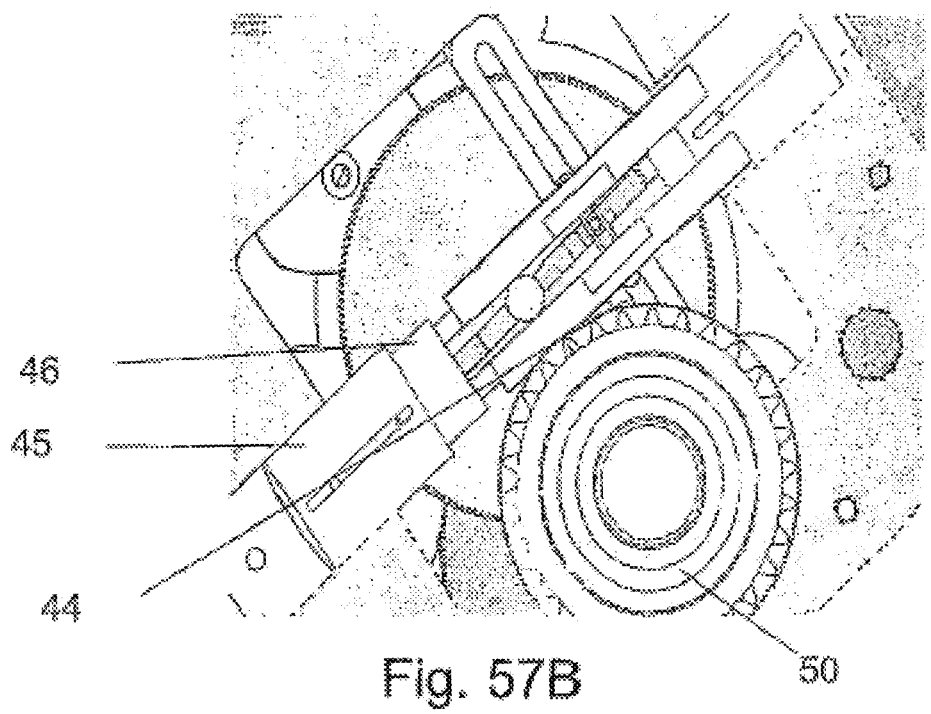
Figure 58:
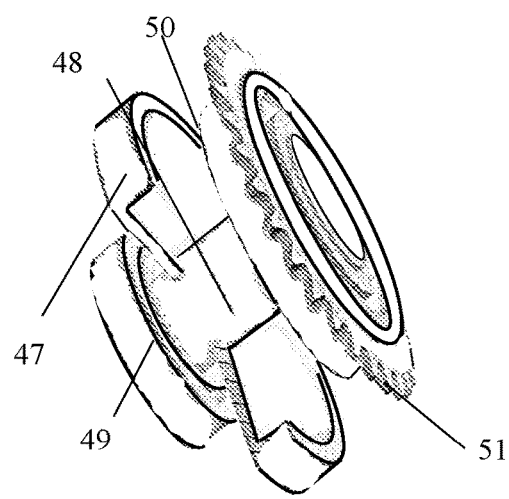

2) Spiral flute mechanism:
  A spiral fluted collar (FIG. 31) with twisted profile is axially attached to the input disk 16. A slot matching the twisted profile of the spiral fluted collar 37 is broached on the ratio cam disk 18 and placed co-axial to the input disk 16. When the distance between the ratio cam disk 18 and the input disk 16 remain unchanged, the input disk 16 and the ratio cam disk 18 spin synchronized. While the distance between the input disk 16 and the ratio cam disk 18 is being altered, the relative angular velocity between the input disk 16 and the ratio cam disk 18 changes as the ratio cam disk 18 is altered making ratio cam disk 18 to rotate with respect to the input disk 16. This axial translation is achieved with a ratio changing spiral flute mechanism lever 41 that pushes a thrust bearing 40 attached to the ratio cam disk 18 towards the input disk 16. This is sprung back with a compression spring 39 (FIG. 56) placed between the input disk 16 and the ratio cam disk 18.

3) Differential-Mechanism:

A large bevel gear stationary differential collar 28b is axially attached to the input disk 16 via a input disk sleeve 24 to bevel (FIG. 32). A stationary differential collar 25 (FIG. 32), which is co-axially spaced to the large bevel gear stationary differential collar 28b, by a thrust bearing 40 is free to spin independently with respect to the large bevel gear stationary differential collar 28b. The stationary differential collar 25 is restricted to move axially with respect to the large bevel gear stationary differential collar 28b. A, free to spin Stationary differential collar spur gear shaft bearing 27 is placed normal to the longitudinal axis of the Stationary Differential Collar 25 in a Stationary differential collar spur gear shaft bearing 26 placed in the stationary differential collar 25. A Small bevel gear stationary differential collar 28a and a Stationary Differential Collar Spur Gear 29 is axially and rigidly attached to the stationary differential collar spur gear shaft 27 and the small bevel gear stationary differential collar 28a is paired with the large bevel gear stationary differential collar 28b.

Figures 16, 17:
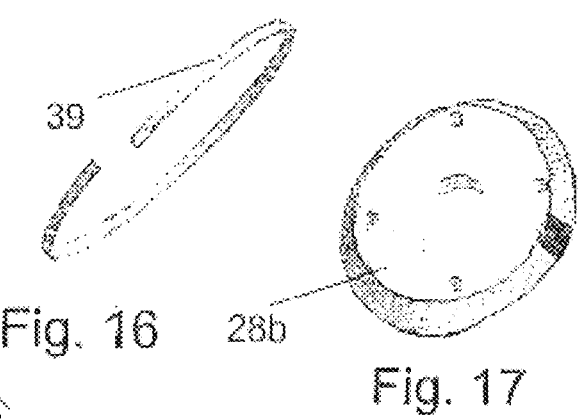
FIG. 17—Large bevel gear stationary differential collar 28b—Perspective view.
Figures 15B, 15C:
Figure 18C:
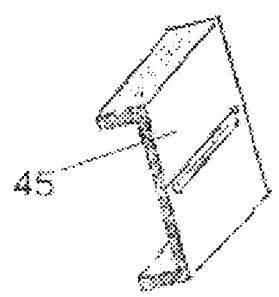
FIG. 18 A through 18C—Primary telescopic sleeve:
   18A—Front view
   18B—Side view
   18C—Perspective view FIG. 19A through 19D—Secondary telescopic sleeve 46:
   19A—Front view
   19B—Side view
   19C—Top view
   19D—Perspective view FIG. 20A through 20C—Ratio cam disk 18:
   20A—Front view
   20B—Top view
   20C—Perspective view FIG. 21 A through 21C—Driven non-circular gear 9:
   21A—Top view
   21B—Front view
   21 C—Perspective view FIG. 22 A through 22C—Driving non-circular gear 8:
22A—Top view
22B—Front view
22C—Perspective view
FIG. 23A through 23C—Dummy crank pin 43: 23A—Top view
23B—Front view
23C—Perspective view
FIG. 24A through 24D—Crank pin 42:
24A—Top view
24B—Front view
24C—Side view
24D—Perspective view
FIG. 25A through 25C—Intermediate circular gears c2 c3 11 which has two circular gears that are co-axial and rigidly connected:
25A—Side View
25B—Front View
25C—Perspective view
FIG. 26A through 26C—Intermediate circular gears C4a-C5a 20 which has two circular gears that are co-axial and rigidly connected:
26A—Side View
26B—Front View
26C—Perspective view
FIG. 27A through 27C—Intermediate circular gears c4 c5 12 which has two circular gears that are co-axial and rigidly connected:
27A—Front view
27B—Top view
27C—Perspective view.
Figure 19C:
Figure 19D:
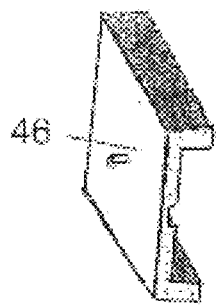
Figures 18A, 18B:
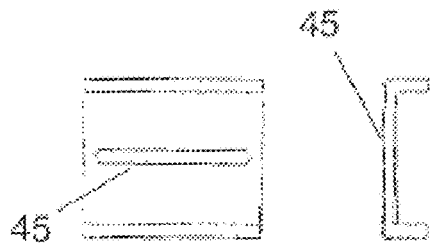
Figure 19A:
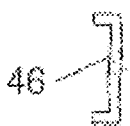
Figure 19B:
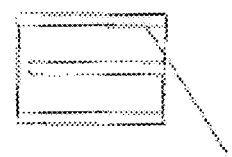
Figure 33D:
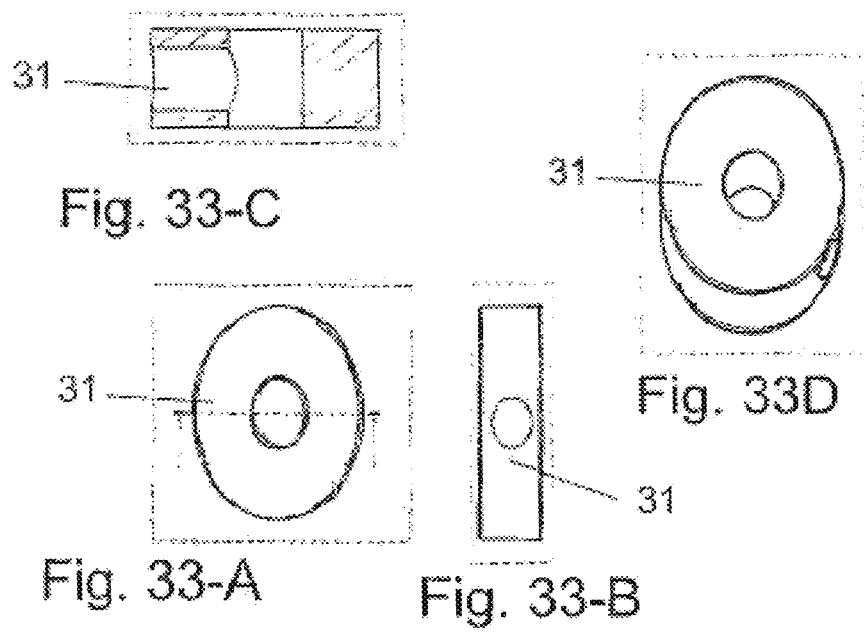
Figure 34:
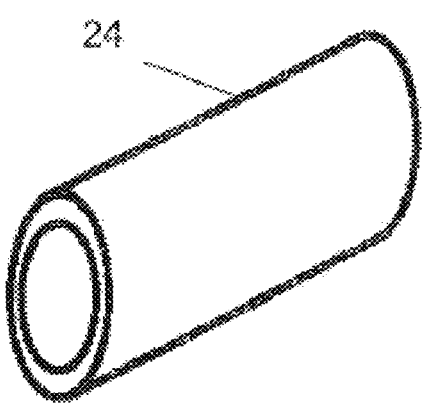
Figure 35:
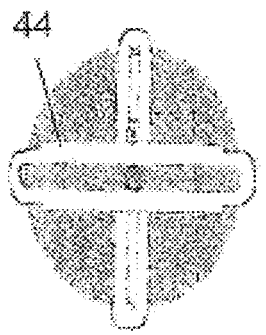
FIG. 35 thru 43—Views showing the movement/position on rack assembly, Crank pin 42 as input disk 16 rotates: shown at various stages.
Figure 36:
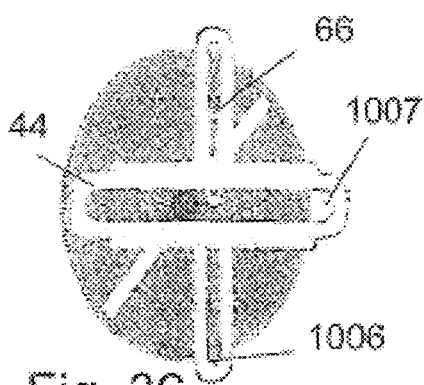

Similarly,

A large bevel gear dynamic differential collar 34b (FIG. 17) is co-axially placed parallel to the ratio cam disk 18 such that they spin synchronized but allowing displacement between them along the longitudinal axis. A dynamic differential collar 31 (FIG. 33) which is co-axially placed to the large bevel gear dynamic differential collar 34b spaced by a thrust bearing 40 is free to spin independently with respect to the large bevel gear dynamic differential collar 34b. The Dynamic differential collar 31 is restricted to move axially with respect to the large bevel gear dynamic differential collar 34b. A, free to spin dynamic differential collar spur gear shaft 33 with a universal joint 36 placed in its longitudinal axis is placed normal to the longitudinal axis of the dynamic differential collar 31 in a bearing dynamic differential collar spur gear shaft bearing 32 placed in the Dynamic differential collar 31. A small bevel gear dynamic differential collar 34a and a dynamic differential collar spur gear 35 is axially and rigidly attached to the dynamic differential collar spur gear shaft 33 and the small bevel gear dynamic differential collar 34a is paired with the large bevel gear dynamic differential collar 34b. The universal joint 36 is common to the dynamic differential collar spur gear shaft 33 and the small bevel gear dynamic differential collar 34a, allowing a small mismatch.

A spur gear spacer 30 keeps the two spur gears in contact. The spur gear spacer 30 (FIG. 29) is free to move axially with respect to dynamic differential collar spur gear shaft 33.

Here the stationary differential collar 25 and the dynamic differential collar 31 are identical and interchangeable.

By this arrangement the dynamic flow train is as described below

I. The large bevel gear stationary differential collar 28b spins small bevel gear stationary differential collar 28a.

II. The small bevel gear stationary differential collar 28a spins the stationary differential collar spur gear shaft 27.

III. The stationary differential collar spur gear shaft bearing 27 spins the stationary differential collar spur gear 29.

IV. The Stationary differential collar spur gear 29 spins dynamic differential collar spur gear 35.

V. The dynamic differential collar spur gear 35 spins dynamic differential collar spur gear shaft 33.

VI. The dynamic differential collar spur gear shaft 33 thru the universal joint 36 spins the small bevel gear dynamic differential collar 34a.

VII. The small bevel gear dynamic differential collar 34a spins the large bevel gear dynamic differential collar 34b.

VIII. The large bevel gear dynamic differential collar 34b spins the ratio cam disk 18.

Since the two large bevel gears, the two small bevel gears, and the spur gears are identical and same size respectively, when the dynamic differential collar 31 is stationary, the angular velocity of the ratio cam disk 18 is synchronized with the input disk 16. While the dynamic differential collar 31 is being rotated with respect to the stationary differential collar 25, there will be a relative angular displacement between the input disk 16 and the ratio cam disk 18.

Figure 80A:
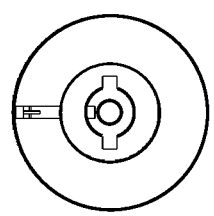
Figure 80D:
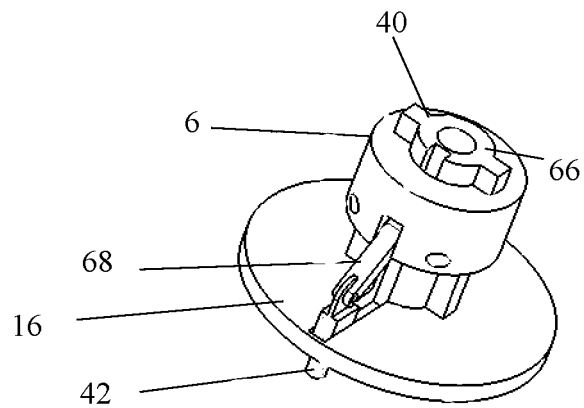
Figure 80B:
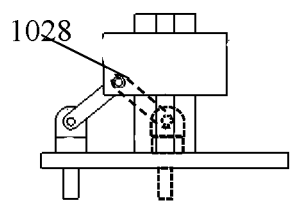
Figure 80C:
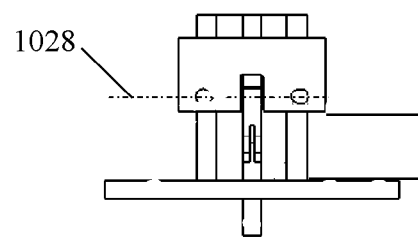
Figure 80E:
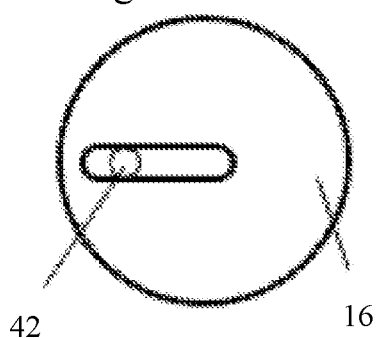

4) Link Mechanism:

The auxiliary input shaft 66 has a cross section with a circular hole in the middle and a non-circular shape for the exterior perimeter. This is paired with a auxiliary input shaft sliding collar 67 with a matching orifice, which is co-axially placed allowing axial movement while restricting rotational motion with respect to each other. A thrust bearing 40 is co-axially placed in contact with one end of the auxiliary input shaft sliding collar 67 and the auxiliary input shaft sliding collar 67 has a pivot 1028 on the other end. One end of a link 68 is attached to the pivot 1028 and the other end of the link 68 is either attached to the crank pin 42, as shown in (FIG. 80) or to the Crank pin shaft collar 70, as shown in (FIG. 81) as appropriate. In order to impart axial movement from a stationary frame to a rotating frame we need a thrust bearing. One side of the thrust bearing is a rotating frame. The other side is a stationary frame. Rotating frame is in contact with the sliding collar. The external force is applied on the stationary frame. Thrust bearing conveys the external force from the stationary frame to the rotating frame and then in turn to the sliding collar. An axial displacement of the auxiliary input shaft sliding collar 67 will cause a radial displacement of the crank pin 42 thru the link 68. This axial translation is achieved with a ratio changing spiral flute mechanism lever 41 that pushes the thrust bearing 40 attached to the sliding collar auxiliary shaft 67. This is sprung back with a compression spring 39 placed between input disk 16 and the auxiliary input shaft sliding collar 67. When this link mechanism is used, the need to have geared tooth profile 1010 on the perimeter of the input disk 16 is eliminated. Also here the radial slot extends all the way from the center of the input disk 16 to allow the crank pin 42 to be able to become co-axial with the auxiliary input shaft 66 as shown in (FIG. 80D).

Also, when this link mechanism is used the driven non-circular gear 9 can also function as the input disk 16 when a radial slot is added to the driven non-circular gear 9, thereby eliminating the need for a separate input disk 16. A cross rack holder 44, input disk 16, driven non-circular gear 9, intermediate circular gears 12 and 20, crank pin 42, ratio cam disk 18, and a ratio changing mechanism is used for two rectifier modules 1001 are used in one scotch yoke mechanism (FIG. 86) and two scotch yoke modules are used in this assembly configuration.

Two Racks 64 are placed on the cross rack holder 44 with a phase shift of 180°

Figure 1:
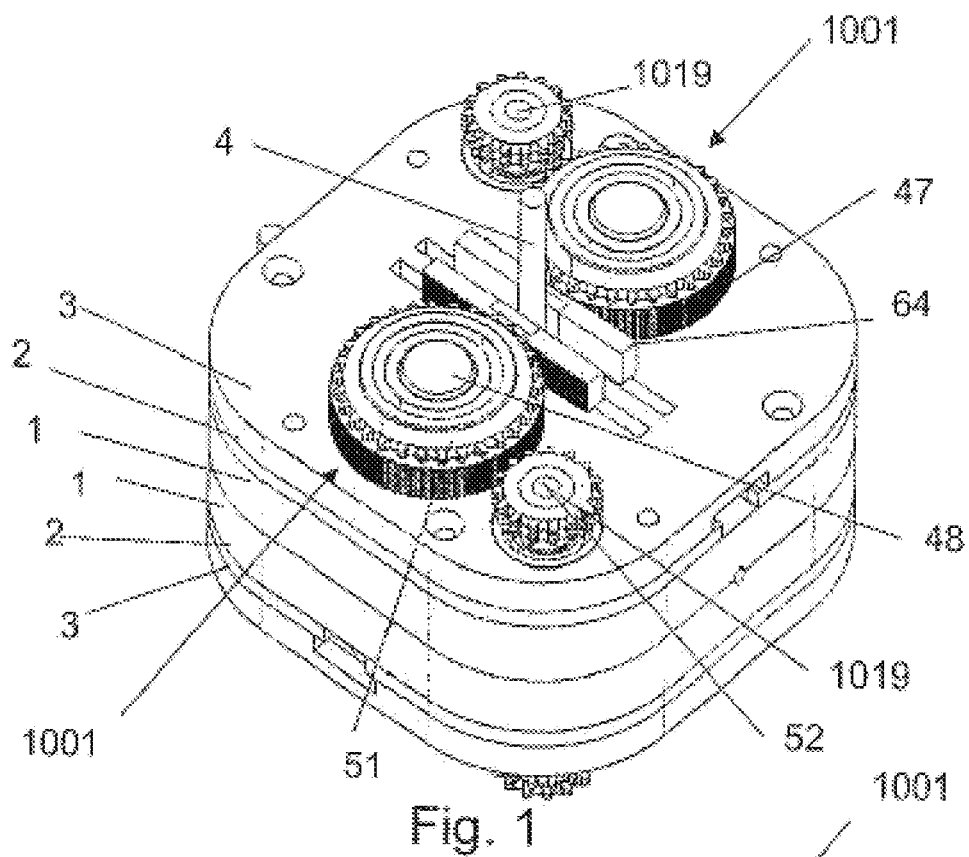
FIG. 1—CVT general sequential assembly perspective view.
Figure 2:
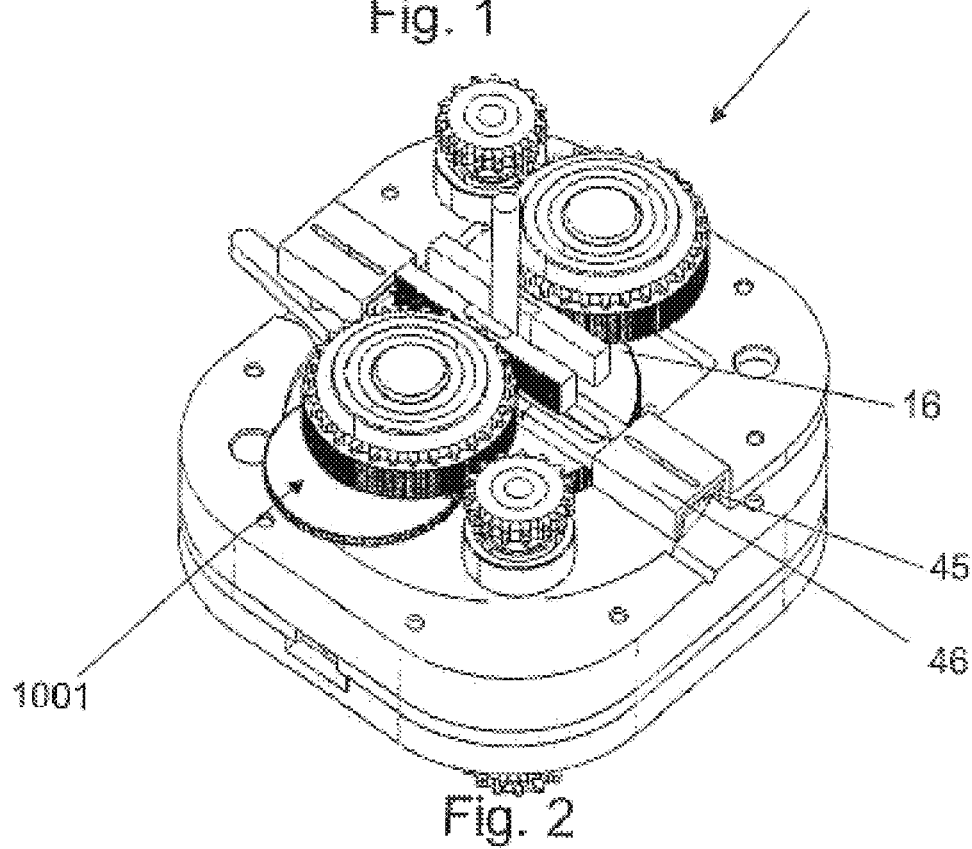
FIG. 2—CVT general sequential assembly perspective view with frames made transparent showing general arrangement of internal sub-assemblies.

Another identical assembly of scotch yoke modules (FIG. 86) with two rectifier modules 1001 is duplicated and placed such that the second assembly of scotch yoke modules (FIG. 86) with two rectifier modules 1001 is a lateral inversion of the first assembly of scotch yoke modules with two rectifier modules 1001 and rotated by 90°. The selection of the plane of lateral inversion creates multiple assembly configurations such as sequential assembly (FIG. 1) or siamese assembly (FIG. 82) which is described below.

ASSEMBLY CONFIGURATIONS: Two assembly configurations are discussed here using the above mentioned modules and a gear changing mechanism.

Namely:
1) Sequential configuration and
2) Siamese configuration.

Figure 3A:
FIGS. 3A and 3B—Main housing frame 1—Two parts are bolted together to form one main housing:
   3A—Perspective view showing details on one side of the main housing.
   3B—Perspective view showing details on the other side of the main housing.
Figure 3B:
Figure 44:
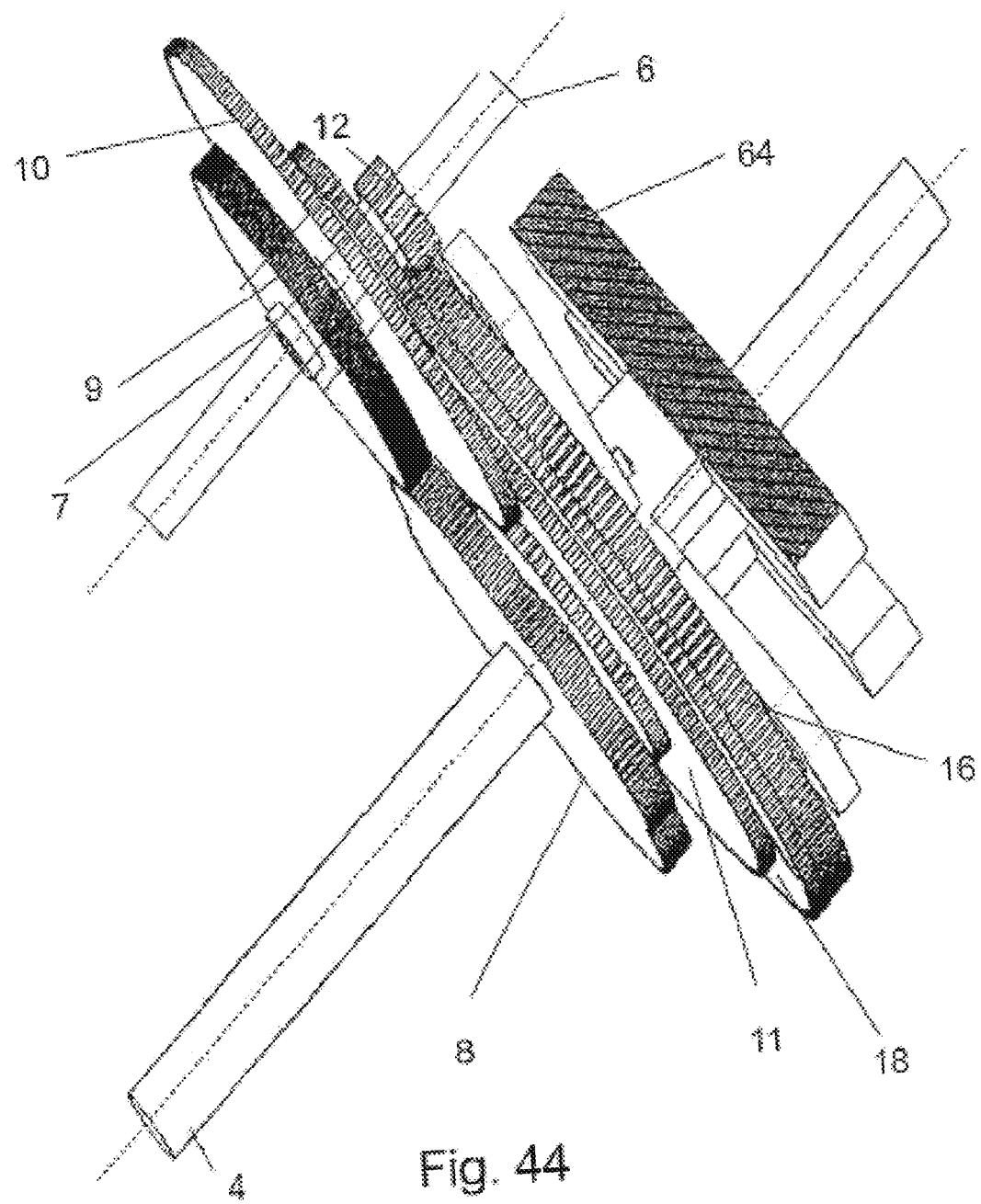
Figure 47:
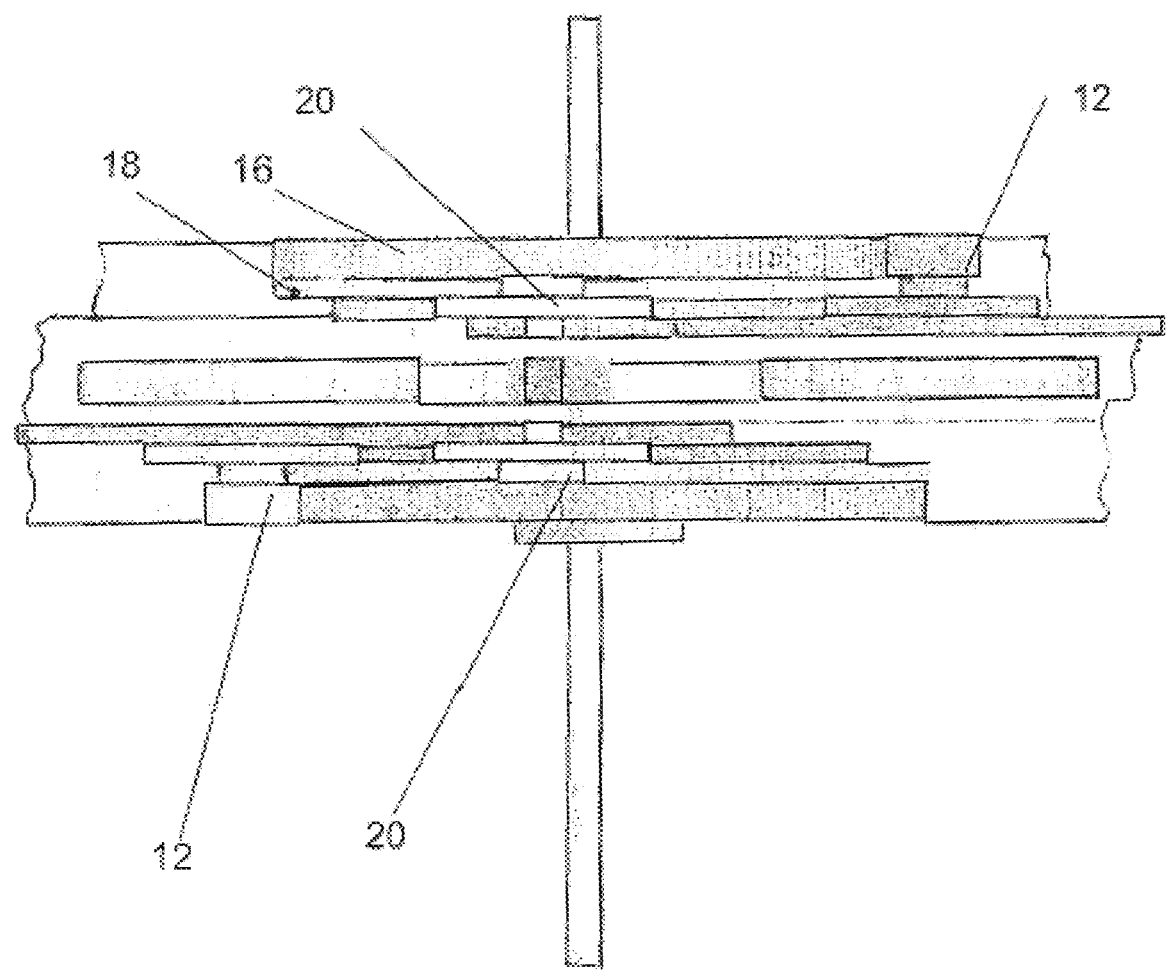
Figure 48:
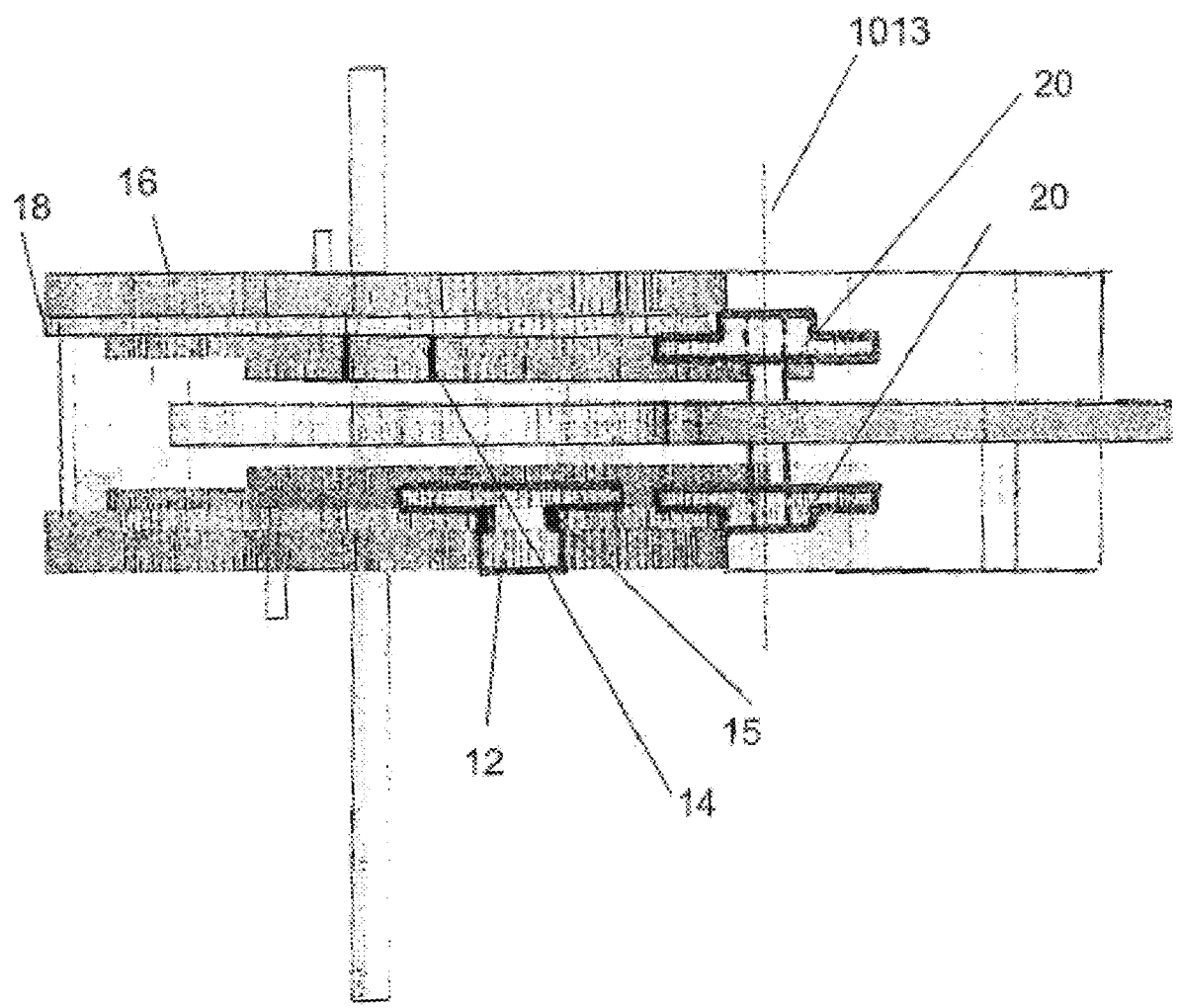
FIG. 48—Side View showing planetary gear changing mechanism. The main frame is made transparent for clarity.
Figure 49:
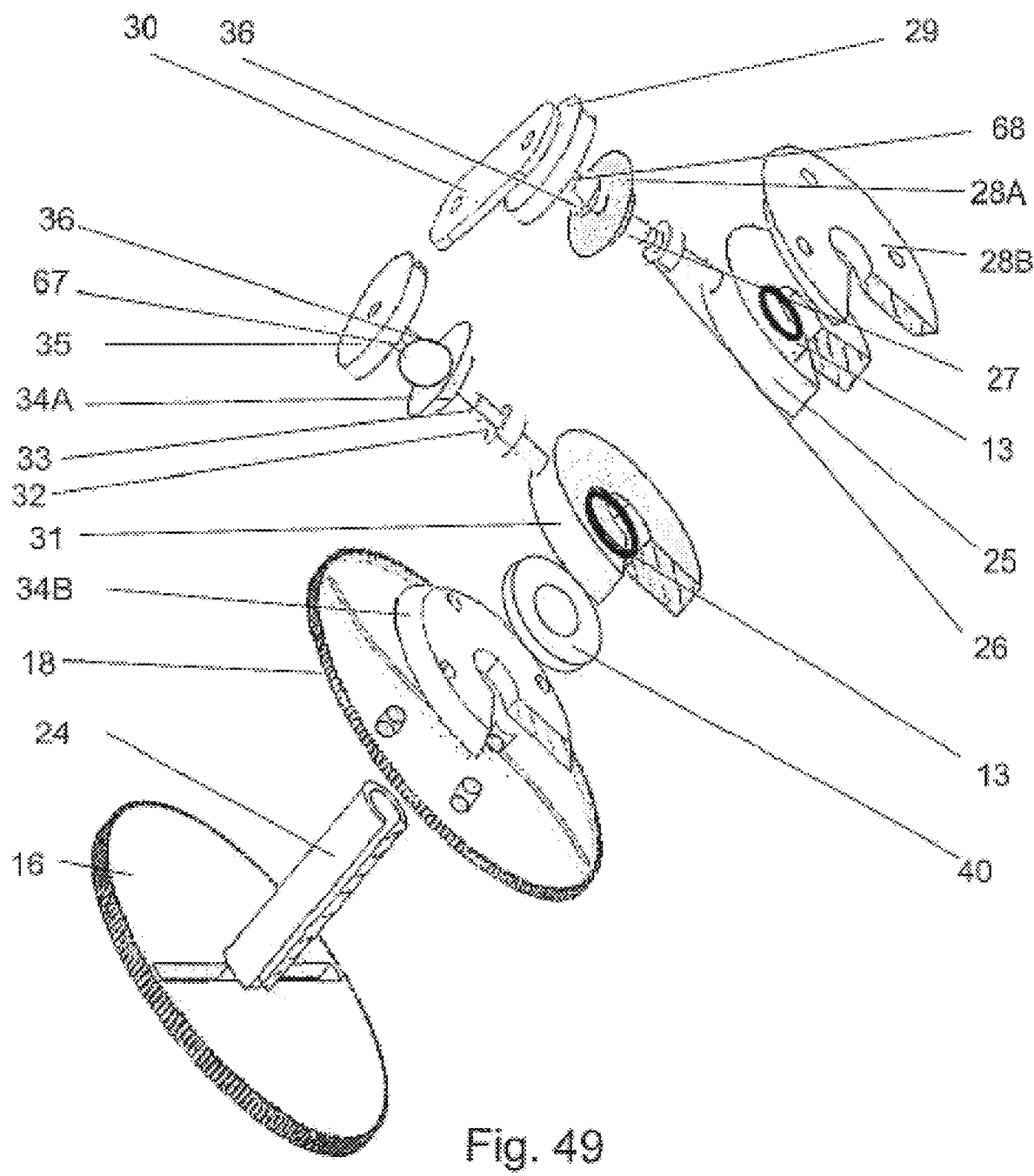
FIG. 49—Exploded view showing differential mechanism, showing component arrangements and working (perspective view).
Figure 50:
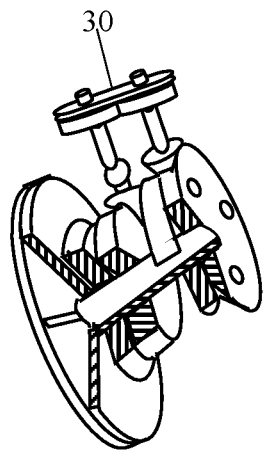
FIG. 50 thru 55—Views describing the ratio changing operation of the differential mechanism at various stages shown partially sectioned to explain the function and interior details.
Figure 51:
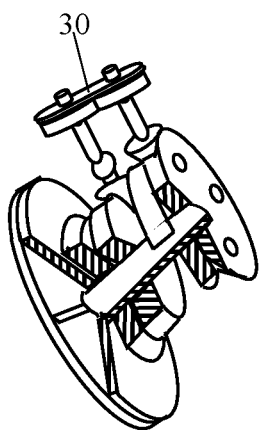
Figure 52:
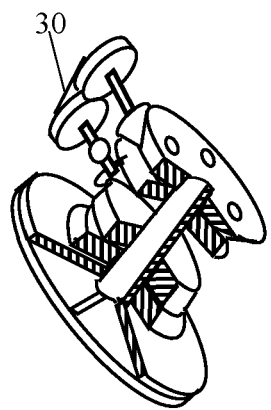
Figure 53:
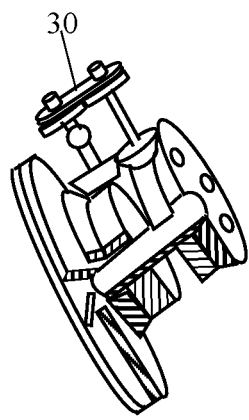
Figure 54:
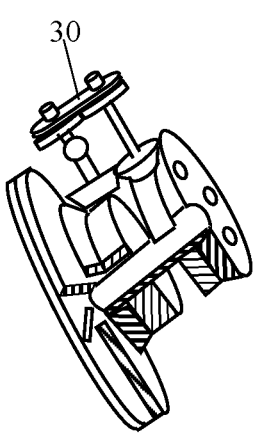
Figure 55:
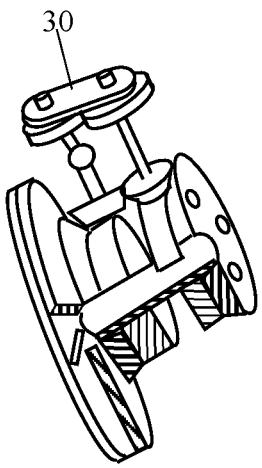

The main difference is how the modules and the gear changing mechanism are arranged and the space and the envelope it occupies. The sequential configuration has a smaller foot print but taller than the Siamese configuration. The choice depends on the available envelope for the CVT Sequential Configuration (FIG. 76):

As shown in FIG. 44, the input shaft 4 is mounted on input shaft bearing 5 and placed in the center of a main housing frame 1 (FIG. 3). The driving non-circular gear 8, the intermediate circular gears C2 C3 11, the scotch yoke module along with the ratio changing mechanism is mounted on the input shaft 4. Here the input shaft 4 is made to pass through the second slot, the input shaft slot 1012 of the Cross rack holder 44. Intermediate gear shaft 6 is mounted on Intermediate gear shaft bearing 7 and placed in the center of the Main housing frame 1. The driven non-circular gear 9 along with intermediate circular gear 10 and intermediate circular gears C4 C5 12 is mounted on intermediate gear shaft 6 parallel to the input shaft 4 at a distance "CTR". The intermediate circular gears C2 C3 11, intermediate circular gears C4 C5 12 and the input disk 16 have clearance fit such that they freewheel on their respective shafts.

The powertrain flow from the input shaft 4 to input disk 16 is as per the table provided below.

| From | To | Type of connection |
|---|---|---|
| Input-Shaft | Driven-Non-Circular-Gear | Axial, Rigid |
| Driven-Non-Circular-Gear | Driving-Non-Circular-Gear | Radial |
| Driving-Non-Circular-Gear | Intermediate gear 1 | Axial, Rigid |
| Intermediate gear 1 | Intermediate gear 2 | Radial |
| Intermediate gear 2 | Intermediate gear 3 | Axial, Rigid |
| Intermediate gear 3 | Intermediate gear 4 | Radial |
| Intermediate gear 4 | Intermediate gear 5 | Axial, Rigid |
| Intermediate gear 5 | Input-Disk | Radial |

While the working of the CVT can be accomplished just with intermediate circular gears C1 10, intermediate circular gears c4 c5 12 and intermediate circular gears c4*a* c5*a* 20, the intermediate circular gears c2 c3 11 are used to achieve 1:1 ratio between the driving non-circular gear 8 to input disk 16, if the ratio between the driving non-circular gear Band the driven non-circular gear 9 is not 1:1 or 1:I where I is an integer or ½ depending on the relationship between the driving non-circular gear 8 and the driven non-circular gear 9.

Two rectifier modules 1001 are placed next to the cross rack holder 44 as shown in FIG. 83 such that the rack 64 is placed normal to the cross rack holder's 44 crank pin slot 1013. When planetary mechanism is used, the crank pin 42 has a body shaped like rectangular prism with circular prism extended on both sides. One of them functions as a cam follower, made to engage with the ratio cam disk 18 and other functions as a crank pin 42, and made to engage with the rack 64 on the cross rack holder 44. This entire assembly, except the driving non-circular gear 8 & driven non-circular gear 9 and the input shaft 4, is duplicated and mirrored about the mid-plane of the longitudinal axis of the driving non-circular gear 8, and rotated by 90°. The driven non-circular gear 9 is duplicated and rotated by 45° or 135° such that the racks 64 are placed at 90° phase shift to the next. The racks 64 are on all the four rectifier module 1001 share one common input shaft 4 and one common driving non circular gear 8. Two of the rectifier modules 1001 share a common Input disk 16 and gear changing mechanism. To accommodate this, the driven non-circular gear 9 is oriented at 45° with the driven non-circular gear 9 phased at 45° relative to the other driven non-circular gear 9. Also due to the fact the non-circular gears are symmetric it can be also oriented at 135°. This adds up to a 90° phase shift between racks 64. This arrangement will allow reduction in the "foot print" of the entire assembly. If the ratio between the angular velocities of the driving non-circular gear 8 and the driven non-circular gear 9 is 1:1 or 1:2, the input disk 16 can be directly connected to the driven non-circular gear 9 allowing the intermediate circular gear C1 10 to "free wheel" on its shaft.

The cross rack holder 44 is free to move only along the direction of the rack 64 and its movement is restricted by a cross rack holder frame 2. A set of telescopic sleeves, primary telescopic sleeve 45 and secondary telescopic sleeve 46 are placed on either side of the cross rack holder 44. This will decrease the overall size needed for the cross rack holder 44 and the main housing frame 1. A prong placed on either side of the cross rack holder 44 and another on the secondary telescopic sleeve 46, to pull and extend the telescopic sleeves and the telescopic sleeves are collapsed by the body of the cross rack holder 44. These telescopic sleeves are caged in by a telescopic guide frame 3 (FIG. 4).

Figure 8:
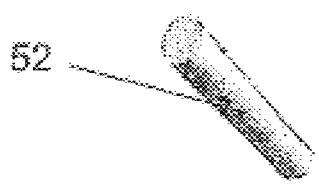
FIG. 8—Power link shaft 52 perspective view.
Figure 59:
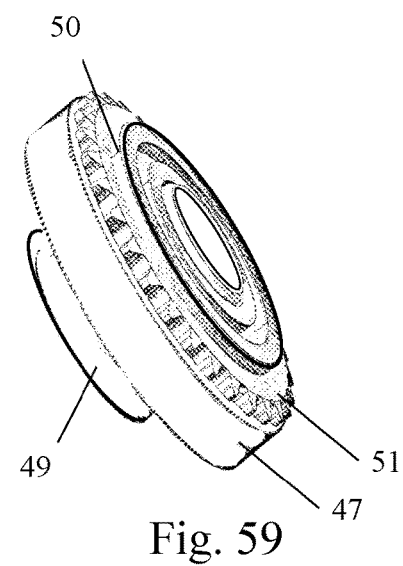
FIG. 59—One way bearing assembly.
Figure 63:
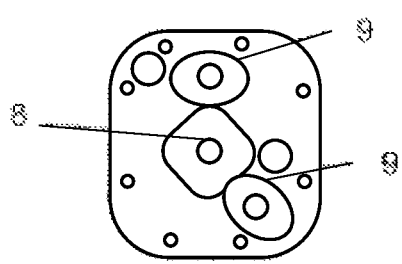
FIG. 63 thru 66—Options of placement of non-circular gears, when a common driving non—circular gear 8 is used with two driven non-circular gears 9.
Figure 65:
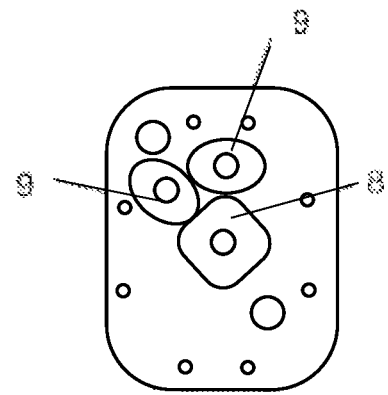
Figure 64:
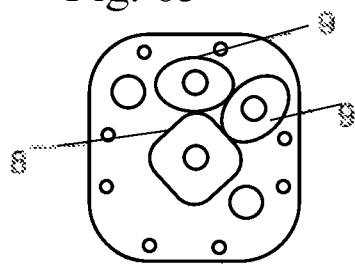
Figure 66:
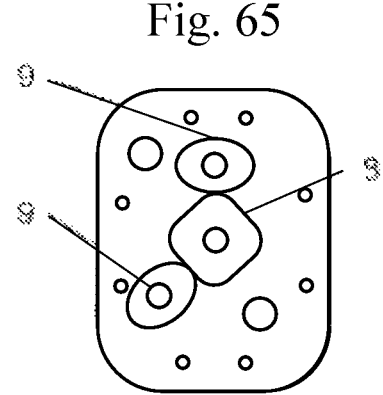
Figure 67:
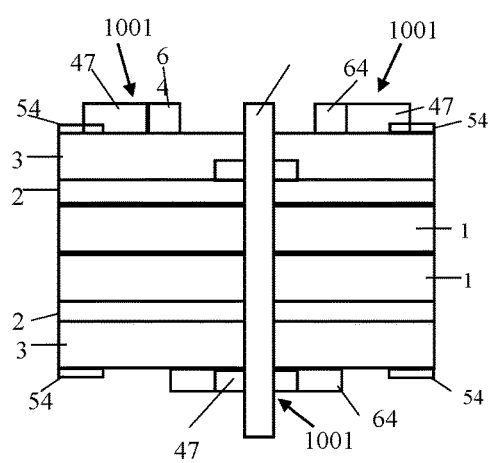
FIG. 67 thru 69—Details showing how constant and uniform output is achieved.

A power link assembly (FIG. 60) is placed parallel to the one way bearing assembly (FIG. 59). The power link assembly (FIG. 60) consists of a power link shaft 52 (FIG. 8) that is mounted on two power link shaft bearing 53 that are placed on the telescopic guide frame 3. An output gear/output sprocket 51 is placed on the power link shaft's 52 each ends. The power from the pinion shaft 48 is transmitted to the power link through power link sprocket/power link gear 54 to output gear/output sprocket 51.

The main purpose of the power link assembly (FIG. 60) is to link the output from each rectifier module so that they are connected in sequence with a set overlap and there is a continuous output. The power link assembly (FIG. 60) consists of a power link shaft 52 that is mounted on two bearings that are placed on the telescopic guide frame 3. A gear or sprocket is placed on the power link shaft's 52 each ends. The power from the pinion shaft 48 is transmitted to the power link shaft 52 through this gear or sprocket 1030.

Siamese configuration (FIG. 82):

Here the construction is identical to the sequential configuration except as noted below.

Figure 7:
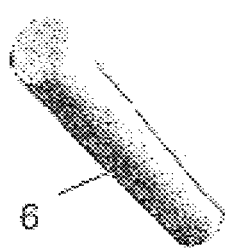
FIG. 7—Intermediate gear shaft 6 perspective view.

In this alternative assembly configuration, the scotch yoke module FIG. 85 and the driven non-circular gear 9 along with the ratio changing mechanism are placed on the auxiliary input shaft 66. The input disk 16 and the driven non-circular gear 9 are directly connected to the auxiliary input shaft 66. Here the need for the second slot, the input slot, on the cross rack holder 44 is eliminated. This eliminates the risk of input shaft 4 slipping into crank pin slot 1013 of the cross rack holder 44 or the crank pin 42 slipping in to the input slot of the cross rack holder 44. Depending on the selection of the ratio changing mechanism, the auxiliary input shaft 66 shaft could have a circular cross section. This modular sub-assembly is placed parallel to the input shaft 4, and mirrored about a plane containing the longitudinal axis of the input shaft 4, such that the planes formed by the longitudinal axis of the input shaft 4 and the longitudinal axis of the auxiliary input shaft 66 form an angle equal to 135°. This configuration has the outputs from each rectifier module 1001 to be placed on the same side of the frame. This allows linking of outputs using output gear/output sprocket 51 and chain and thereby eliminates the need for the power link shaft 52. The input shaft 4 is mounted on two input shaft bearing 5 and placed in the center of the main housing frame (s) 1 (FIG. 3). The input disk 16 is mounted on the input shaft 4 and sandwiched between the rack holder (FIG. 10) and the ratio cam disk 18 and the crank pin 42 is caged in the slot, The crank pin 42 has a body shaped like rectangular prism with circular prism extended on both sides. One of them functions as a cam follower, made to engage with the ratio cam disk 18 and other functions as a crank pin 42, and made to engage with the rack 64 on the cross rack holder 44. Parallel to the input disk 16 the driving non-circular gear 8 is mounted on the input shaft 4. The intermediate gear shaft 6 (FIG. 7) is mounted on intermediate gear shaft bearing 7, with one in each of the main housing frame 1. The intermediate gear shaft 6 is placed parallel to the input shaft 4 at a distance "CTR" that is used to derive the shape of the non-circular gears. The powertrain flow from the input shaft 4 to the input disk 16 is as per the table provided below.

| From | To | Type of connection |
|---|---|---|
| Input-Shaft | Driven-Non-Circular-Gear | Axial, Rigid |
| Driven-Non-Circular-Gear | Driving-Non-Circular-Gear | Radial |
| Driving-Non-Circular-Gear | Intermediate gear 1 | Axial, Rigid |
| Intermediate gear 1 | Intermediate gear 2 | Radial |
| Intermediate gear 2 | Intermediate gear 3 | Axial, Rigid |
| Intermediate gear 3 | Intermediate gear 4 | Radial |
| Intermediate gear 4 | Intermediate gear 5 | Axial, Rigid |
| Intermediate gear 5 | Input Disk | Radial |

Arrangement of Transmission of Power from Engine/Power Source to Input Disk 16:

By using a set of non-circular gears, the driving non-circular gear 8 (FIG. 8) and the driven non-circular gear 9 (FIG. 9), the rate of change in angular displacement at the input disk 16 is altered. The output from the input shaft 4 is transferred through a set of non-circular gears and then transferred to the input disk 16 via five intermediate circular gears. The driving non-circular gear 8 is mounted directly on the input shaft 4. The driven non-circular gear 9 is mounted on the intermediate gear shaft 6 (FIG. 7), which is mounted on two intermediate gear shaft bearing 7 and placed on the two main housing frame 1.

The intermediate circular gear C1 10 is mounted on the intermediate gear shaft 6, with a direct connection to the driven non-circular gear 9. The intermediate circular gears c2 c3 11 (FIG. 25) is mounted on the input shaft 4, free to spin with a circular gear C2 C3 bearing 14.

The intermediate circular gears c4 c5 12 (FIG. 26) is mounted on the intermediate gear shaft 6 that is free to spin with a circular gear C2 C3 bearing 14 and intermediate gear C5 drives the input disk 16.

Reason behind the need for a circular gear between the non-circular gears when the pitch curve 1006 interferes/multiple contacts at the same instant: This also can be eliminated by having multiple layers for the non-circular gears.

From the equations for the non-circular gear pitch curves 1006, it can be seen that the radius of the driven non-circular gear 9 is lower than the input shaft 4 it is mounted on over a wide region and reaches zero at two locations. In addition, there is a potential that, due to the shape of the pitch curve 1006, the driven non-circular gear 9 and the driving non-circular gear 8 may have multiple contact points at a given time. This can be eliminated by inserting an intermediate non-circular gear connector 62 between the two non-circular gears intermediate non-circular gear connector guide 63. This increases the distance between the two non-circular gears and eliminates the issue of multiple contact point at any given time.

Crank-Pin-Displacement-Mechanism:

Two concepts are used namely 1) Axis at slot intersection and 2) Axis on rack 64

Crank pin axis 1029 at slot intersection: This can be achieved by rotating the ratio cam disk 18 which has a slot with a certain profile. When the ratio cam disk 18 is rotated with respect to the input disk 16 this profile forces the crank pin 42 to move in radial direction of the disk's longitudinal axis. This is because the longitudinal axis of the crank pin 42 intersects the slot input disk 16 and the slot in the ratio cam disk 18. When the crank pin 42 is closer to the longitudinal axis 1021 of the input disk 16 the stroke is shorter and since the work done is constant, the force is increased. Similarly with the crank pin 42 is farther from the longitudinal axis 1021 of the input disk 16, the stroke is longer and since the work done is constant, the force is decreased. The challenge here is to have the ratio cam disk 18 and the input disk 16 spinning synchronized during normal operation however, and when the ratio change is desired, the input disk 16 and the ratio cam disk 18 should have a relative angular velocity. By using one of the three mechanisms described below, a relative angular velocity between the input disk 16 and the ratio cam disk 18 can be achieved, when desired.

crank pin axis 1029 on the rack: This method to change the location of the crank pin 42 is shown in FIG. 91. Here a crank pin rack spur gear 72 is mounted on the modified input disk 75 and the modified ratio cam 76 has a ring gear profile matching the crank pin rack spur gear k 72. The relative instantaneous rotation of the modified input disk 75 and the modified ratio cam 76 is used to spin the spur gear mounted on the input disk 16, which in turn moves a crank pin rack 73 attached to the crank pin 42. Here the crank pin rack 73 is placed in a the notched input shaft 74 as shown in FIG. 91 such that the crank pin 42 can be moved co-axial with the input disk 16 allowing a zero oscillation of the rack 64.

Concept Behind Using Telescopic Sleeve to Enable Compact Design:

For this design to work the length of the input slot of the rack assembly has to be a value equal to 2*stroke+input shaft diameter+2* minimum material thickness+2* the distance to reach the rack guide. This entire length has to be guided by the rack guide. Since the rack guide also has to accommodate the travel of the rack 64, the opening portion of the rack guide should have a width at least as the diameter of the input disk 16 or it will be out of reach when the rack 64 travels to one side to the extreme. The telescopic guide extends the support and as a result, the overall length of the rack assembly can be reduced by the "distance to reach the rack guide." This also makes it possible for the main housing frame 1 to be shorter by that distance. Prongs are provided in the design of the rack assembly and in the secondary telescopic sleeve 46 to extend the telescopic-sleeves. The body of the cross rack holder 44 collapses the telescopic-sleeves.

Concept Behind Use/Working Function of Crank Pin Retainer 71:

The crank pin 42 is much smaller than the input shaft 4. Since both the slots cross each other, there is a potential that the crank pin 42 can slip in to the input shaft slot. This is eliminated by using a crank pin retainer 71 (FIG. 13) that is larger than the input shaft slot. This is made to float in the crank pin slot enclosing the crank pin 42.

Figure 68:
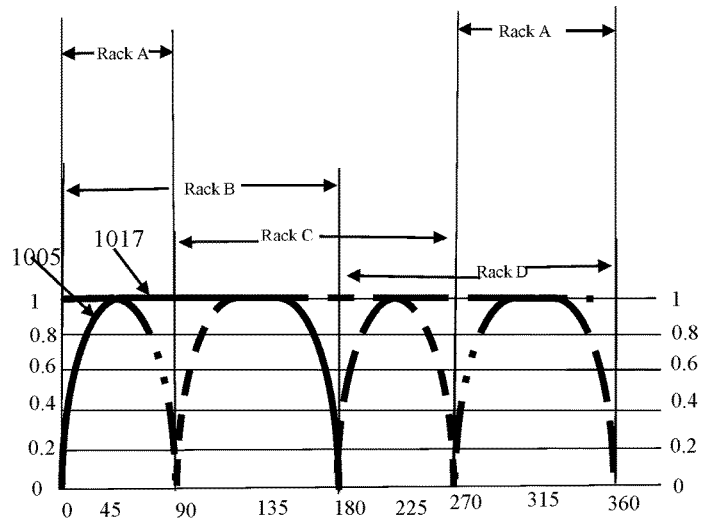

Concept of Overlap of Power Transmission:

To ensure smooth transition from one rectifier module 1001 to the next, for a brief period both the rectifier modules 1001 are active and engage when the output from both of them reach a constant and uniform value. The overlap between each pair of adjacent rectifier modules is substantially identical (FIGS. 68 and 69). The first rectifier module 1001 disengages while it is still in the functional region 1017 and the second rectifier module 1001 is well in the functional region 1017. The functional region 1017 of the non-circular gear can be defined as the region when in contact, the rack 64 has a constant velocity. When the computer controlled clutch is used, it links the pinion shaft 48 to the output gear/output sprocket 51, only when the pinion 47 rotates in a specific direction and when the respective driven non-circular gears 9 are in a functional region 1017 as shown in FIG. 88.

Modules and their Assembly Layout and Constraints:

All the four rectifier modules 1001 share one common input shaft 4 and one common driving non-circular gear 8. Two of the rectifier modules 1001 share a common input disk 16 and a gear changing mechanism. The racks 64 are placed at 90° phase shift to the next. To accommodate this, the driven non-circular gear 9 is oriented at 45° with the driven non-circular gear 9 phased at 45° relative to the other driven non-circular gear 9. Also due to the fact the non-circular gears are symmetric it can be also oriented at 135°. This adds up to a 90° phase shift between racks 64.

Concept of Power Transfer/Link Between Modules:

When the rectifier modules 1001 operate in sequence, they must be linked before the power is transferred to the wheel system 1022. This is achieved by using a power link shaft 52 that has output gear/output sprocket 51 to link the output from each rectifier module 1001 such that it has a continuous power to the wheel system 1022. The power is also transferred in sequence. The rectifier module 1001 are oriented such that their non-circular gears are in functional region 1017 in sequence with overlap 1016 (FIG. 69) when the input disk 16 completes about one revolution, ensuring that at least one rectifier module 1001 is in functional region 1017 at any given time, thus completing about one cycle.

Reverse Gear Mechanism:

The output from the CVT output shaft 38 or the co-axial output element with internal gear/planetary gear co axial output element with internal gear/planetary gear 65 is coupled with miter/bevel gear shaft 58. The output of these miter/bevel gear 59 will therefore rotate in opposite directions. The miter/bevel gear differential output shaft 61 of this differential mechanism is placed co-axial to the output miter/bevel gear 59 with clearance so that it is free to spin independently with respect to the output miter/bevel gear 59. Two collars with a clutch are placed on the miter/bevel gear differential output shaft 61 allowing them to move axially. These can be made to link with either of the output miter/bevel gear 59, which rotate in opposite direction. When one of the collars is made to link via the park/neutral/reverse clutch 60, by means of clutch, with a particular output miter/bevel gear 59 and the miter/bevel gear differential output shaft 61 will rotate in a particular direction. It will reverse its direction if the link is swapped to the other miter/bevel gear 59.

Neutral Gear Mechanism:

When the collars are not in link via the park/neutral/reverse clutch 60 with any of the miter/bevel gear 59, the collar and thee miter/bevel gear differential output shaft 61 is not restricted and, therefore, they are free to spin in any direction and function as a "neutral" gear.

Park Mechanism:

When the collars are in link via the park/neutral/reverse clutch 60 with both the miter/bevel gear 59, the collar is restricted from spinning and the miter/bevel gear differential output shaft 61 is totally restricted and, therefore, they are restricted to spin in any direction and functions as a "parking" gear.

Feature and Mechanism to Compensate Vibration:

1. Dummy crank pin 43: The crank pin 42 is placed off-center when the input disk 16 revolves. This imbalance will result in vibration. To compensate this, a dummy crank pin 43 is placed at same distance 180° apart. This is moved by the same ratio cam disk 18 that moves the crank pin 42. This movement is identical to the movement of the crank pin 42. The cam slots are made identical at 180° apart.
2. Dummy rack 55 for counter oscillation: As the input disk 16 rotates the cross rack holder 44 has an oscillatory motion which will result in vibration. It is cancelled by having an appropriate mass oscillating in the opposite direction. This is achieved by attaching a vibration cancellation mechanism wheel 56 in contact with the rack 64, which will spin back and forth. Bringing an appropriate mass in contact with the vibration cancellation mechanism wheel 56 at 180° apart will compensate for this vibration.

Co-Axial Input-Output Option Feature:

When co-axial input and output is desired, this can be achieved by adding a co axial output element with internal gear/planetary gear co axial output element with internal gear/planetary gear 65 which has an internal gear, namely a ring gear placed co-axial with input shaft 4. The co axial output element with internal gear/planetary gear co axial output element with internal gear/planetary gear 65 will radially connect with all the output gear/output sprocket 51 and the power link sprocket/power link gear 54, directly or via an intermediate gears or planet gears of a planetary gear system.

Converting CVT to an IVT (Infinitely Variable Transmission):

Having a co-axial input and output allows the CVT to function as a IVT. This cam be achieved by adding a planetary gear system with a sun gear, ring gear and planets supported by carriers, and linking with input shaft 4, the co axial output element with internal gear/planetary gear co axial output element with internal gear/planetary gear 65.

The following are the options to achieve this:

a) The input shaft 4 is directly linked to the sun gear of the planetary gear system with following 2 sub options:
   a. The co axial output element with internal gear/planetary gear co axial output element with internal gear/planetary gear 65 is directly linked to the carrier of the planetary gear system and ring gear of the planetary gear system functions as the final output or wheel system 1022
   b. The co axial output element with internal gear/planetary gear co axial output element with internal gear/planetary gear 65 is linked to the ring gear of the planetary gear system and the carrier functions as the final output or wheel system 1022.

b) The co axial output element with internal gear/planetary gear co axial output element with internal gear/planetary gear 65 is directly linked to the sun gear of the planetary gear system with following 2 sub-options.
   a. The input shaft 4 is directly linked to the carrier of the planetary gear system and the ring gear of the planetary gear system and the ring gear of the planetary gear system functions as the final output or wheel system 1022.
   b. The input shaft 4 is directly linked to the ring gear of the planetary gear system and the carrier functions as the final output or wheel system.

c) The input shaft 4 is directly linked to the ring gear of the planetary gear system with following 2 sub options
   a. The co axial output element with internal gear/planetary gear co axial output element with internal gear/planetary gear 65 is directly linked to the Carrier of the planetary gear system and sun gear of the planetary gear system functions as the final output or wheel system 1022.
   b. The co axial output element with internal gear/planetary gear co axial output element with internal gear/planetary gear 65 is linked to the ring gear of the planetary gear system and the carrier functions as the final output or wheel system 1022.

d) The co axial output element with internal gear/planetary gear co axial output element with internal gear/planetary gear 65 is directly linked to the Ring-Gear of the planetary gear system with following 2 sub options.
   a. The input shaft 4 is directly linked to the carrier of the planetary gear system and the carrier of the planetary gear system and the sun gear of the planetary gear system functions as the final output or wheel system 1022.
   b. The input shaft 4 is directly linked to the sun gear of the planetary gear system and the carrier functions as the final output or wheel system 1022.

e) The input shaft 4 is directly linked to the carrier of the planetary gear system with following 2 sub options
   a. The co axial output element with internal gear/planetary gear co axial output element with internal gear/planetary gear 65 is directly linked to the ring gear of the planetary gear system and sun gear of the planetary gear system functions as the final output or wheel system 1022.
   b. The co axial output element with internal gear/planetary gear co axial output element with internal gear/planetary gear 65 is linked to the Sun-Gear of the Planetary-Gear-System and the Sun-Gear functions as the final output or wheel system 1022.

f) The co axial output element with internal gear/planetary gear co axial output element with internal gear/planetary gear 65 is directly linked to the Carrier of the planetary gear system with following 2 sub options.
   a. The input shaft 4 is directly linked to the ring gear of the planetary gear system and the ring gear of the planetary gear system and the sun gear of the planetary gear system functions as the final output or wheel system 1022.
   b. The input shaft 4 is directly linked to the sun gear of the planetary gear system and the ring gear functions as the final output or wheel system 1022.

In other words, The co axial output element with internal gear/planetary gear co axial output element with internal gear/planetary gear 65 is connected to one of the three elements, either a ring gear, a carrier, or a sun gear of a planetary gear system. The input shaft 4 is connected to one of the remaining two elements of the planetary gear system. The third remaining element of the planetary system functions as the final output or wheel system 1022. This converts the CVT to an IVT.

Concept of Temporary Storage of Power in a Flywheel:

When the power from the engine or power source is not transmitted to the final output or the wheel system, the power can be transferred to a flywheel system 1023 temporarily and transferred back to input shaft 4 and then to the final output or the wheel system 1022 or directly to the final output or wheel system 1022 when desired.

Development of Mathematical Model:

The main aim is to determine a mathematical formula for the pitch curves 1006 of the non-circular gears such that $v_{rack}$ (linear velocity of the rack 64) is constant. Pitch curves 1006 are needed to develop non-circular gears.

The pitch curves for the driving non-circular gear 8 and driven non-circular gear 9, when expressed using Cartesian coordinates $(X_1, Y_1)$ and $(X_2, Y_2)$ respectively, as a function of an angle $\theta$ are, $$X_1 \approx \frac{CTR * \frac{d\Phi(\theta)}{d\theta}}{1 + \frac{d\Phi(\theta)}{d\theta}} * \cos(\theta),$$

$$Y_1 \approx \frac{CTR * \frac{d\Phi(\theta)}{d\theta}}{1 + \frac{d\Phi(\theta)}{d\theta}} * \sin(\theta)$$

$$X_2 \approx \frac{CTR}{1 + \frac{d\Phi(\theta)}{d\theta}} * \cos(\Phi(\theta)),$$

$$Y_1 \approx \frac{CTR}{1 + \frac{d\Phi(\theta)}{d\theta}} \sin(\Phi(\theta))$$

where $\Phi(\theta)$ is a solution to a piece-wise differential equation that uses a Sine function Where $$G(\theta) = \frac{k_i * \left(\theta - \frac{2*\pi*i}{N*n}\right)}{\left(\theta_{1_i} - \frac{2*\pi*i}{N*n}\right)} \text{ if } \frac{2*\pi*i}{N*n} < \theta < \theta_{1_i}$$

$$k_i \text{ if } \theta_{1_i} < \theta < \theta_{2_i}$$

$$k_i - 2 * \frac{k_i * (\theta - \theta_{2_i})}{(\theta_{3_i} - \theta_{2_i})} \text{ if } \theta_{2_i} < \theta < \theta_{3_i}$$

$$-k_i \text{ if } \theta_{3_i} < \theta < \theta_{4_i}$$

$$-k_i + \frac{k_i * (\theta - \theta_{4_i})}{\left(\frac{2*\pi*(i+1)}{N*n} - \theta_{4_i}\right)} \text{ if } \theta_{4_i} < \theta < \frac{2*\pi*(i+1)}{N*n}$$

Where the boundary conditions are:

$$\Phi(\theta) = 0$$

$$\Phi(\theta_{1_i}) = \frac{\Delta + 2*\pi*i}{N}$$

$$\Phi(\theta_{2_i}) = \frac{\pi - \Delta + 2*\pi*i}{N}$$

$$\Phi(\theta_{3_i}) = \frac{\pi + \Delta + 2*\pi*i}{N}$$

$$\Phi(\theta_{4_i}) = \frac{2*\pi - \Delta + 2*\pi*i}{N}$$

$$\Phi\left(\frac{\pi + 2*\pi*i}{N*n}\right) = \frac{\pi + 2*\pi*i}{N}$$

Or a differential equation using a Cosine function $$N * \frac{d\Phi}{d\theta} * \cos(N*\Phi) = k_i, \text{ if } \frac{i*2*\pi}{N*n} < \theta < \theta_{1_i}$$

$$k_i - 2 * \frac{k_i * (\theta - \theta_{1_i})}{(\theta_{2_i} - \theta_{1_i})}, \text{ if } \theta_{1_i} < \theta < \theta_{2_i},$$

$$-k_i, \text{ if } \theta_{2_i} < \theta < \theta_{3_i},$$

$$-k_i + 2 * \frac{k_i * (\theta - \theta_{3_i})}{(\theta_{4_i} - \theta_{3_i})}, \text{ if } \theta_{3_i} < \theta < \theta_{4_i},$$

$$k_i, \text{ if } \theta_{4_i} < \theta < \frac{(i+1)*2*\pi}{N*n}$$

With the boundary conditions below:

$$\Phi(0) = 0$$

$$\Phi(\theta_{1_i}) = \frac{\frac{\pi}{2} - \Delta + 2*\pi*i}{N}$$

$$\Phi(\theta_{2_i}) = \frac{\frac{\pi}{2} + \Delta + 2*\pi*i}{N}$$

$$\Phi(\theta_{3_i}) = \frac{\frac{3*\pi}{2} - \Delta + 2*\pi*i}{N}$$

$$\Phi(\theta_{4_i}) = \frac{\frac{3*\pi}{2} + \Delta + 2*\pi*i}{N}$$

$$\Phi\left(\frac{2*\pi*(i+1)}{N*n}\right) = \frac{2*\pi*(i+1)}{N}$$

Where $\theta$ is angular displacement of the driving non-circular gear 8

$\Phi$ is the angular position of the driven non-circular gear 9

$\theta_{1_i}, \theta_{2_i}, \theta_{3_i}, \theta_{4_i}$, specific values of angular position of the driving non-circular gear 8 to be solved where the ranges from $\theta_{1_i}$ to $\theta_{2_i}$, and $\theta_{3_i}$ to $\theta_{4_i}$, are functional regions 1017 and $$\frac{2*\pi*i}{N*n}$$

to $\theta_{1_i}$ and $\theta_{2_i}$ to $\theta_{3_i}$ and $\theta_{4_i}$ to $$\frac{2*\pi*(i+1)}{N*n}$$

are non-functional regions $k_i$ is an unknown constant that needs to be solved for using the boundary conditions for the Input disk 16 ith rotation the constant of integration also needs to be solved for using boundary conditions $\Delta$ is the cutoff angle between the first functional and non-functional regions N is the number of times the input disk 16 rotates when the driven non-circular gear 9 rotates once n is the number of times the driven non-circular gear 9 rotates when the driving non-circular gear 8 rotates once i refers to the ith rotation of the input disk 16 starting with i=0 and going up to i=N*n−1

In our simple design, the following parameters were used: N=2, n=2. So, using the Sine function $$2 * \frac{d\Phi}{d\theta} * \sin(2*\theta) = G(\theta)$$

Where $G(\theta) = \frac{k_0 * (\theta)}{(\theta_{1_0})}$ if $0 < \theta < \theta_{1_0}$ $$k_0 \text{ if } \theta_{1_0} < \theta < \theta_{2_0}$$

$$k_0 - 2 * \frac{k_0 * (\theta - \theta_{2_0})}{(\theta_{3_0} - \theta_{2_0})} \text{ if } \theta_{2_0} < \theta < \theta_{3_0}$$

$$-k_0 \text{ if } \theta_{3_0} < \theta < \theta_{4_0}$$

$$-k_0 + \frac{k_0 * (\theta - \theta_{4_0})}{\left(\frac{2*\pi}{4} - \theta_{4_0}\right)} \text{ if } \theta_{4_0} < \theta < \frac{2*\pi}{4}$$

$$\frac{k_1 * \left(\theta - \frac{2*\pi}{4}\right)}{\left(\theta_{1_1} - \frac{2*\pi}{4}\right)} \text{ if } \frac{2*\pi}{4} < \theta < \theta_{1_1}$$

$$k_1 \text{ if } \theta_{1_1} < \theta < \theta_{2_1}$$

$$k_1 - 2 * \frac{k_1 * (\theta - \theta_{2_1})}{(\theta_{3_1} - \theta_{2_1})} \text{ if } \theta_{2_1} < \theta < \theta_{3_1}$$

$$-k_1 \text{ if } \theta_{3_1} < \theta < \theta_{4_1}$$

-continued $$-k_1 + \frac{k_1 * (\theta - \theta_{4_1})}{\left(\frac{4*\pi}{4} - \theta_{4_1}\right)} \text{ if } \theta_{4_1} < \theta < \frac{4*\pi}{4}$$

$$\frac{k_2 * \left(\theta - \frac{4*\pi}{4}\right)}{\left(\theta_{1_2} - \frac{4*\pi}{4}\right)} \text{ if } \frac{4*\pi}{4} < \theta < \theta_{1_2}$$

$$k_2 \text{ if } \theta_{1_2} < \theta < \theta_{2_2}$$

$$k_2 - 2 * \frac{k_2 * (\theta - \theta_{2_2})}{(\theta_{3_2} - \theta_{2_2})} \text{ if } \theta_{2_2} < \theta < \theta_{3_2}$$

$$-k_2 \text{ if } \theta_{3_2} < \theta < \theta_{4_2}$$

$$-k_2 + \frac{k_2 * (\theta - \theta_{4_2})}{\left(\frac{6*\pi}{4} - \theta_{4_2}\right)} \text{ if } \theta_{4_2} < \theta < \frac{6*\pi}{4}$$

$$\frac{k_3 * \left(\theta - \frac{6*\pi}{4}\right)}{\left(\theta_{1_3} - \frac{6*\pi}{4}\right)} \text{ if } \frac{6*\pi}{4} < \theta < \theta_{1_3}$$

$$k_3 \text{ if } \theta_{1_3} < \theta < \theta_{2_3}$$

$$k_3 - 2 * \frac{k_3 * (\theta - \theta_{2_3})}{(\theta_{3_3} - \theta_{2_3})} \text{ if } \theta_{2_3} < \theta < \theta_{3_3}$$

$$-k_3 \text{ if } \theta_{3_3} < \theta < \theta_{4_3}$$

$$-k_3 + \frac{k_3 * (\theta - \theta_{4_3})}{\left(\frac{8*\pi}{4} - \theta_{4_3}\right)} \text{ if } \theta_{4_3} < \theta < \frac{8*\pi}{4}$$

And the boundary conditions are:

$$\Phi(0) = 0$$

$$\Phi(\theta_{1_0}) = \frac{\Delta}{2}$$

$$\Phi(\theta_{2_0}) = \frac{\pi - \Delta}{2}$$

$$\Phi(\theta_{3_0}) = \frac{\pi + \Delta}{2}$$

$$\Phi(\theta_{4_0}) = \frac{2*\pi - \Delta}{2}$$

$$\Phi\left(\frac{\pi}{4}\right) = \frac{\pi}{2}$$

$$\Phi(\theta_{1_1}) = \frac{\Delta + 2*\pi}{2}$$

$$\Phi(\theta_{2_1}) = \frac{\pi - \Delta + 2*\pi}{2}$$

$$\Phi(\theta_{3_1}) = \frac{\pi + \Delta + 2*\pi}{2}$$

$$\Phi(\theta_{4_1}) = \frac{2*\pi - \Delta + 2*\pi}{2}$$

$$\Phi\left(\frac{3*\pi}{4}\right) = \frac{3*\pi}{2}$$

$$\Phi(\theta_{1_2}) = \frac{\Delta + 4*\pi}{2}$$

$$\Phi(\theta_{2_2}) = \frac{\pi - \Delta + 4*\pi}{2}$$

$$\Phi(\theta_{3_2}) = \frac{\pi + \Delta + 4*\pi}{2}$$

$$\Phi(\theta_{4_2}) = \frac{2*\pi - \Delta + 4*\pi}{2}$$

-continued $$\Phi\left(\frac{5*\pi}{4}\right) = \frac{5*\pi}{2}$$

$$\Phi(\theta_{1_3}) = \frac{\Delta + 6*\pi}{2}$$

$$\Phi(\theta_{2_3}) = \frac{\pi - \Delta + 6*\pi}{2}$$

$$\Phi(\theta_{3_3}) = \frac{\pi + \Delta + 6*\pi}{2}$$

$$\Phi(\theta_{4_3}) = \frac{2*\pi - \Delta + 6*\pi}{2}$$

$$\Phi\left(\frac{7*\pi}{4}\right) = \frac{7*\pi}{2}$$

Using the Cosine function, we get $$2 * \frac{d\Phi}{d\theta} * \cos(2*\theta) = k_0, \text{ if } 0 < \theta < \theta_{1_0}$$

$$k_0 - 2 * \frac{k_0 * (\theta - \theta_{1_0})}{(\theta_{2_0} - \theta_{1_0})}, \text{ if } \theta_{1_0} < \theta < \theta_{2_0},$$

$$-k_0, \text{ if } \theta_{2_0} < \theta < \theta_{3_0},$$

$$-k_0 + 2 * \frac{k_0 * (\theta - \theta_{3_0})}{(\theta_{4_0} - \theta_{3_0})}, \text{ if } \theta_{3_0} < \theta < \theta_{4_0},$$

$$k_0, \text{ if } \theta_{4_0} < \theta < \frac{2*\pi}{4}$$

$$k_1, \text{ if } \frac{2*\pi}{4} < \theta < \theta_{1_1}$$

$$k_1 - 2 * \frac{k_1 * (\theta - \theta_{1_1})}{(\theta_{2_1} - \theta_{1_1})}, \text{ if } \theta_{1_1} < \theta < \theta_{2_1},$$

$$-k_1, \text{ if } \theta_{2_1} < \theta < \theta_{3_1},$$

$$-k_1 + 2 * \frac{k_1 * (\theta - \theta_{3_1})}{(\theta_{4_1} - \theta_{3_1})}, \text{ if } \theta_{3_1} < \theta < \theta_{4_1},$$

$$k_1, \text{ if } \theta_{4_1} < \theta < \frac{4*\pi}{4}$$

$$k_2, \text{ if } \frac{4*\pi}{4} < \theta < \theta_{1_2}$$

$$k_2 - 2 * \frac{k_2 * (\theta - \theta_{1_2})}{(\theta_{2_2} - \theta_{1_2})}, \text{ if } \theta_{1_2} < \theta < \theta_{2_2},$$

$$-k_2, \text{ if } \theta_{2_2} < \theta < \theta_{3_2},$$

$$-k_2 + 2 * \frac{k_2 * (\theta - \theta_{3_2})}{(\theta_{4_2} - \theta_{3_2})}, \text{ if } \theta_{3_2} < \theta < \theta_{4_2},$$

$$k_2, \text{ if } \theta_{4_2} < \theta < \frac{6*\pi}{4}$$

$$k_3, \text{ if } \frac{6*\pi}{4} < \theta < \theta_{1_3}$$

$$k_3 - 2 * \frac{k_3 * (\theta - \theta_{1_3})}{(\theta_{2_3} - \theta_{1_3})}, \text{ if } \theta_{1_3} < \theta < \theta_{2_3},$$

$$-k_3, \text{ if } \theta_{2_3} < \theta < \theta_{3_3},$$

$$-k_3 + 2 * \frac{k_3 * (\theta - \theta_{3_3})}{(\theta_{4_3} - \theta_{3_3})}, \text{ if } \theta_{3_3} < \theta < \theta_{4_3},$$

$$k_3, \text{ if } \theta_{4_3} < \theta < \frac{8*\pi}{4}$$

Where the boundary conditions are:

$$\Phi(0) = 0$$

$$\Phi(\theta_{1_0}) = \frac{\frac{\pi}{2} - \Delta}{2}$$

$$\Phi(\theta_{2_0}) = \frac{\frac{\pi}{2} + \Delta}{2}$$

$$\Phi(\theta_{3_0}) = \frac{\frac{3*\pi}{2} - \Delta}{2}$$

$$\Phi(\theta_{4_0}) = \frac{\frac{3*\pi}{2} + \Delta}{2}$$

$$\Phi\left(\frac{2*\pi}{4}\right) = \frac{2*\pi}{2}$$

$$\Phi(\theta_{1_1}) = \frac{\frac{\pi}{2} - \Delta + 2*\pi}{2}$$

$$\Phi(\theta_{2_1}) = \frac{\frac{\pi}{2} + \Delta + 2*\pi}{2}$$

$$\Phi(\theta_{3_1}) = \frac{\frac{3*\pi}{2} - \Delta + 2*\pi}{2}$$

$$\Phi(\theta_{4_1}) = \frac{\frac{3*\pi}{2} + \Delta + 2*\pi}{2}$$

$$\Phi\left(\frac{4*\pi}{4}\right) = \frac{4*\pi}{2}$$

$$\Phi(\theta_{1_2}) = \frac{\frac{\pi}{2} - \Delta + 4*\pi}{2}$$

$$\Phi(\theta_{2_2}) = \frac{\frac{\pi}{2} + \Delta + 4*\pi}{2}$$

$$\Phi(\theta_{3_2}) = \frac{\frac{3*\pi}{2} - \Delta + 4*\pi}{2}$$

$$\Phi(\theta_{4_2}) = \frac{\frac{3*\pi}{2} + \Delta + 4*\pi}{2}$$

$$\Phi\left(\frac{6*\pi}{4}\right) = \frac{6*\pi}{2}$$

$$\Phi(\theta_{1_3}) = \frac{\frac{\pi}{2} - \Delta + 6*\pi}{2}$$

$$\Phi(\theta_{2_3}) = \frac{\frac{\pi}{2} + \Delta + 6*\pi}{2}$$

$$\Phi(\theta_{3_3}) = \frac{\frac{3*\pi}{2} - \Delta + 6*\pi}{2}$$

$$\Phi(\theta_{4_3}) = \frac{\frac{3*\pi}{2} + \Delta + 6*\pi}{2}$$

$$\Phi\left(\frac{8*\pi}{4}\right) = \frac{8*\pi}{2}$$

In the most general form, $\Phi(0)$ is a solution to a piece-wise differential equation $N * \frac{d\Phi(\theta)}{d\theta} * \sin(N*\Phi)$ function of any linear or nonlinear curve connecting the points $\left(\frac{i*2*\pi}{N*n}, 0\right)$ to $(\theta_{1_i}, k_i)$ if $\frac{i*2*\pi}{N*n} < \theta < \theta_{1_i}$ $k_i$ if $\theta_{1_i} < \theta < \theta_{2_i}$, function of any linear or nonlinear curve connecting the points $(\theta_{2_i}, k_i)$ to $(\theta_{3_i}, -k_i)$ $-k_i$ if $\theta_{3_i} < \theta < \theta_{4_i}$, function of any linear or nonlinear curve connecting the points $(\theta_{4_i}, -k_i)$ to $\left(\frac{(i+1)*2*\pi}{N*n}, 0\right)$ if $\theta_{4_i} < \theta < \frac{(i+1)*2*\pi}{N*n}$

OR $N * \frac{d\Phi(\theta)}{d\theta} * \cos(N*\Phi) = k_i$ if $\frac{i*2*\pi}{N*n} < \theta < \theta_{1_i}$, function of any linear or nonlinear curve connecting the points $(\theta_{1_i}, k_i)$ to $(\theta_{2_i}, -k_i)$ $-k_i$, if $\theta_{2_i} < \theta < \theta_{3_i}$, if $\theta_{1_i} < \theta < \theta_{2_i}$, function of any linear or nonlinear curve connecting the points $(\theta_{3_i}, -k_i)$ to $(\theta_{4_i}, k_i)$, if $\theta_{3_i} < \theta < \theta_{4_i}$, $k_i$, if $\theta_{4_i} < \theta < \frac{(i+1)*2*\pi}{N*n}$, Where the boundary conditions are $$\Phi(0) = 0$$

$$\Phi\left(\frac{(i+1)*2*\pi}{N*n}\right) = \frac{(i+1)*2*\pi}{N}$$

$$\Phi(\theta_{1_i}) = \frac{i*2*\pi}{N} + \Phi_1$$

$$\Phi(\theta_{2_i}) = \frac{i*2*\pi}{N} + \Phi_2$$

$$\Phi(\theta_{3_i}) = \frac{i*2*\pi}{N} + \Phi_3$$

$$\Phi(\theta_{4_i}) = \frac{i*2*\pi}{N} + \Phi_4$$

Where
θ is the angular displacement of the driving non-circular gear
Φ is the angular displacement of the driven non-circular gear
i refers to the i-th revolution the input disk 16 from O to $N*n-1$ with the $1^{st}$ rotation being i=0;
N is the number of times the input disk 16 spins when the driven non-circular gear spins once; The value of N will depend on the radii of the intermediate circular gears.
n is the number of times the driven non-circular gear spins when the driving non-circular gear spins once;
the regions where the piece-wise function is constant are functional regions and the regions where the piece-wise function is not constant are non-functional regions which can be linear or non-linear functions of θ;
$\theta_{1_i}, \theta_{2_i}, \theta_{3_i}, \theta_{4_i}$ specific angular positions of the driving non-circular gear, the values of which need to be solved for using the solution to the differential equation;

$\Phi_1$, $\Phi_2$, $\Phi_3$ and $\Phi_4$ are specific angular positions of the driven non-circular gear corresponding to angular positions $\theta_{1_i}$, $\theta_{2_i}$, $\theta_{3_i}$, $\theta_{4_i}$ of the driving non-circular gear respectively, and are the cutoff between functional and non-functional regions the values of which need to be chosen;

$k_i$ are constants which needs to be solved for, however would be all equal;

Where "i" refers to the ith rotation of the input disk 16 with the $1^{st}$ rotation being i=0

The piece-wise function can be set up for a 1 whole cycle of the rack movement function or multiple cycles, or part of a cycle (only if using symmetric rack movement function). Reflection techniques can be used to get the complete pitch curve for the driving and driven non-circular gears.

$t_{n+1_i}$ can be related to $t_{n_i}$ using symmetry conditions or treated as unrelated to each other using another set of boundary conditions.

$t_{n+1_i}$ can be related to $t_{n_i}$ using cycle period equation or treated as unrelated to each other using another set of boundary conditions.

The same constant k can be used all the way through or treated as different in each term and solved for using appropriate boundary conditions, however they would all have the same values.

Appropriate remaining boundary conditions can be chosen to solve for the remaining unknown variables.

The pitch curves of the driving non-circular gear and the driven non-circular gear have maximal and minimal values for the radius and multiple parts which can be derived from each other by successive mirroring about appropriate planes. This is shown in FIGS. 89 and 90 where the four parts 1007 of each of the non-circular gears can be derived by mirroring each other.

The invention claimed is:

1. An infinitely variable transmission comprising:
   A) at least one scotch yoke module comprising:
      a. a crank pin revolving around
      b. a notched auxiliary input shaft, at an offset distance between longitudinal axes of the crank pin and the auxiliary input shaft that remain parallel to each other, wherein the offset distance can be altered from zero when the crank pin is co-axial with the auxiliary input shaft to a non-zero number by displacing the crank pin along a radial slot of
      c. an input disk rigidly mounted on the auxiliary input shaft by
   B) a crank pin displacement mechanism comprising:
      a. a sliding collar disposed co-axially with the auxiliary input shaft, with a feature preventing relative angular displacement while allowing relative translation between the sliding collar and the auxiliary input shaft,
      b. a link assembly comprising:
         i. a link having a first end and a second end, the first end connected to the crank pin by a
         ii. crank pin pivot pin, the second end connected to the sliding collar by
         iii. a sliding collar pivot pin,
            wherein an axial displacement of the sliding collar causes radial movement of the crank pin through the link assembly,
      c. at least one thrust bearing that is co-axially placed in contact with the sliding collar such that an external force applied on the thrust bearing causes an axial displacement of the thrust bearing and the sliding collar with respect to the auxiliary input shaft, which alters the offset distance by moving the crank pin through the notch and along the radial slot of the input disk,
      d. a slotted rack holder comprising one or more racks, which is restricted to only move along a direction of a longitudinal axis of the one or more racks, and a crank pin slot for receiving the crank pin, with a longitudinal axis of the crank pin slot orthogonal to the one or more racks,
   C) an input shaft,
   D) at least one driving non-circular gear mounted on the input shaft and driving
   E) at least one driven non-circular gear mounted co-axially on the auxiliary input shaft, at a fixed orientation to the slot of the input disk and
   F) at least one rectifier module comprising:
      a. a pinion engaged with the one or more racks, and mounted on
      b. a pinion shaft through
      c. a computer-controlled clutch, a one-way bearing, or a ratchet mechanism;
   arranged such that a uniform rotation of the at least one driving non-circular gear via the input shaft, causes a non-uniform angular velocity of the auxiliary input shaft via the at least one driven non-circular gear, causing the crank pin to reciprocate the rack substantially along a longitudinal direction of the rack at a substantially constant velocity and slowing down briefly during direction reversal and accelerating to the constant velocity, where a magnitude of the reciprocation is proportional to the offset distance of the crank pin and the auxiliary input shaft, and the reciprocation of the rack causes an alternating rotation of the pinion and the rotation of the pinion is converted to a unidirectional rotation of an output gear or an output sprocket mounted on the pinion shaft via the computer controlled clutch, the one way bearing or the ratchet mechanism.

2. The infinitely variable transmission of claim 1, wherein the feature preventing relative angular displacement while allowing relative translation between the sliding collar and the auxiliary input shaft, is further defined as the auxiliary input shaft having a non-circular cross section and the sliding collar having a non-circular orifice matching the non-circular cross section.

3. The continuously variable transmission of claim 1, wherein a pitch curve of the at least one driving non-circular gear and a pitch-curve of the at least one driven non-circular gear, when expressed using Cartesian coordinates $(X_1, Y_1)$ and $(X_2, Y_2)$ respectively, as a function of angle $\theta$ are $$X_1 \approx \frac{CTR * \frac{d\Phi(\theta)}{d\theta}}{1 + \frac{d\Phi(\theta)}{d\theta}} * \cos(\theta),$$

$$Y_1 \approx \frac{CTR * \frac{d\Phi(\theta)}{d\theta}}{1 + \frac{d\Phi(\theta)}{d\theta}} * \sin(\theta);$$

$$X_2 \approx \frac{CTR}{1 + \frac{d\Phi(\theta)}{d\theta}} * \cos(\Phi(\theta)),$$

$$Y_2 \approx \frac{CTR}{1 + \frac{d\Phi(\theta)}{d\theta}} \sin(\Phi(\theta)),$$

where $\Phi(\theta)$ is a solution to a piece-wise differential equation $$N * \frac{d\Phi}{d\theta} * \sin(N * \Phi) = \text{a function of any linear or}$$

nonlinear curve connecting points $\left(\frac{i * 2 * \pi}{N * n}, 0\right)$ to $(\theta_{1_i}, k_i)$ if $\frac{i * 2 * \pi}{N * n} < \theta < \theta_{1_i}$, $k_i$ if $\theta_{1_i} < \theta < \theta_{2_i}$, -continued a function of any linear or nonlinear curve connecting points $(\theta_{2_i}, 0)$ to $(\theta_{3_i}, -k_i)$ if $\theta_{2_i} < \theta < \theta_{3_i}$, $-k_i$ if $\theta_{3_i} < \theta < \theta_{4_i}$, a function of any linear or nonlinear curve connecting points $(\theta_{4_i}, 0)$ to $\left(\dfrac{(i+1)*2*\pi}{N*n}, -k_i\right)$ if $\theta_{4_i} < \theta < \dfrac{(i+1)*2*\pi}{N*n}$

OR $N * \dfrac{d\Phi}{d\theta} * \cos(N*\Phi) = k_i$ if $\dfrac{i*2*\pi}{N*n} < \theta < \theta_{1_i}$, a function of any linear or nonlinear curve connecting points $(\theta_{1_i}, k_i)$ to $(\theta_{2_i}, -k_i)$ if $\theta_{1_i} < \theta < \theta_{2_i}$, $-k_i$, if $\theta_{2_i} < \theta < \theta_{3_i}$, a function of any linear or nonlinear curve connecting points $(\theta_{3_i}, -k_i)$ to $(\theta_{4_i}, k_i)$ if $\theta_{3_i} < \theta < \theta_{4_i}$, $k_i$, if $\theta_{4_i} < \theta < \dfrac{(i+1)*2*\pi}{N*n}$, where boundary conditions are:

$$\Phi(0) = 0,$$

$$\Phi\left(\dfrac{(i+1)*2*\pi}{N*n}\right) = \dfrac{(i+1)*2*\pi}{N},$$

$$\Phi(\theta_{1_i}) = \dfrac{i*2*\pi}{N} + \Phi_1,$$

$$\Phi(\theta_{2_i}) = \dfrac{i*2*\pi}{N} + \Phi_2,$$

$$\Phi(\theta_{3_i}) = \dfrac{i*2*\pi}{N} + \Phi_3,$$

$$\Phi(\theta_{4_i}) = \dfrac{i*2*\pi}{N} + \Phi_4$$

where
CTR is a center to center distance of the at least one driving non-circular gear and the at least one driven non-circular gear,
$\theta$ is an angular displacement of the at least one driving non-circular gear,
$\Phi$ is an angular displacement of the at least one driven non-circular gear,
i refers to an i-th revolution of the input disk from 0 to $N*n-1$ with a 1st rotation being $i=0$;
N is a number of times the input disk rotates when the at least one driven non-circular gear rotates once;
n is a number of times the at least one driven non-circular gear rotates when the at least one driving non-circular gear rotates once;
regions where the piece-wise function is constant are functional regions and regions where the piece-wise function is not constant are non-functional regions which can be linear or non-linear functions of $\theta$;
$\theta_{1_i}, \theta_{2_i}, \theta_{3_i}, \theta_{4_i}$ are specific angular positions of the at least one driving non-circular gear, the values of which are solved for using a solution to the piece-wise differential equation;
$\Phi_1, \Phi_2, \Phi_3, \Phi_4$ are the specific angular positions of the at least one driven non-circular gear corresponding to angular positions $\theta_{1_i}, \theta_{2_i}, \theta_{3_i}, \theta_{4_i}$ of the at least one driving non-circular gear respectively, and are a cutoff between the functional and non-functional regions, values of which are chosen;
and $k_i$ are constants which are all equal.

4. The continuously variable transmission of claim 3, wherein the pitch-curve of the driving non-circular gear and driven non-circular gear each has $N_1$ maximal and $N_1$ minimal values for its radius and $2N_1$ parts which can be derived from each other by successive mirroring about planes at an angle $C*\pi/N_1$ radians to an x axis of the Cartesian coordinates, wherein C and $N_1$ are integers.

5. The continuously variable transmission of claim 3, wherein a sum of all functional regions of all the driven non-circular gears is greater than or equal to 360° and all the driven non-circular gears are placed such that non-circular gear pairs are in the functional region in sequence with an overlap between the functional regions of consecutive driven non-circular gears.

6. The continuously variable transmission of claim 5, wherein the at least one driven non-circular gear is in the functional region in sequence with the overlap when the input disk completes substantially approximately one rotation, ensuring that the at least one driven gear is in the functional region at any given time.

7. The continuously variable transmission of claim 5, wherein an amount of overlap between the non-circular gear pairs are substantially identical.

8. The continuously variable transmission of claim 3, wherein an intermediate circular gear is placed between the at least one driving non-circular gear and the at least one driven non-circular gear which are spaced apart and each mesh with the intermediate circular gear, wherein a central axis of the intermediate circular gear is restricted to move only along an imaginary line connecting central axes of the at least one driving non-circular gear and the at least one driven non-circular gear.

9. The continuously variable transmission of claim 1, further comprising a plurality of gears or sprockets and chains, which operably connect the output gear or output sprocket of the rectifier module to a subsequent rectifier module via a power link shaft.

10. The continuously variable transmission of claim 9, further comprising a differential assembly comprising:
a) an input miter bevel gear and
b) a pair of substantially co-axial output miter bevel gears operably connected with the input miter bevel gear such that the output miter bevel gears rotate in opposite directions, each output miter bevel gear having a through-bore substantially at a central axis thereof and substantially co-axial with each other;
c) a through-shaft positioned through the through-bores of the output miter bevel gears; and
d) a pair of collars operably coupled with the through-shaft and rotatably fixed therewith, each collar configured to move axially along the through-shaft independently of the other collar and configured to engage with one of the output miter bevel gears; wherein the power link shaft is operably coupled with the input miter bevel gear to cause rotation of the input miter gear.

11. The continuously variable transmission of claim 10, wherein:
when a first one of the collars is engaged with a first one of the output miter bevel gears and a second one of the collars is not engaged with a second one of the output miter bevel gears, the through-shaft rotates about its longitudinal axis in a first direction corresponding to a rotational direction of the first one of the output miter bevel gears; and when the second one of the collars is engaged with the second one of the output miter bevel gears and the first one of the collars is not engaged with the first one of the output miter bevel gears, the through-shaft rotates about its longitudinal axis in a second direction corresponding to a rotational direction of the second one of the output miter bevel gears.

12. The continuously variable transmission of claim 10, wherein when neither of the collars are engaged with the output miter bevel gears, the through-shaft is free to rotate in any direction about its longitudinal axis.

13. The continuously variable transmission of claim 10, wherein when each of the collars are engaged with a respective one of the output miter bevel gears, the through-shaft is restricted from rotating about its longitudinal axis.

14. The continuously variable transmission of claim 9, wherein the power link shaft is operably coupled to an output member via at least one gear or sprocket that is co-axial with a longitudinal axis of the input shaft.

15. The continuously variable transmission of claim 1, wherein a slider guide having a substantially rectangular slot is positioned in the crank-pin-slot of the rack and surrounds the crank pin.

16. The continuously variable transmission of claim 1, further comprising a dead weight and a wheel that transfers motion from the one or more racks to a dummy rack with teeth identical to the one or more racks and located 180 degrees relative to the one or more racks, and the dummy rack moves in a substantially opposite direction of the one or more racks.

17. The continuously variable transmission of claim 16, further comprising a dummy crank pin having a mass substantially identical to a mass of the crank pin that slides in an opposite direction of the crank pin.

18. The continuously variable transmission of claim 1, wherein the input shaft is connected to a ring gear, a carrier or a sun gear, the output from the output gear thru an output shaft is connected to another one of the ring gear, the carrier or the sun gear and a final output is connected to another one of the ring gear, the carrier or the sun gear.

19. An infinitely variable transmission comprising:
A) at least one scotch yoke module comprising:
 a) a crank pin perpendicularly mounted on
 b) a crank pin collar having a non-circular orifice and sliding on
 c) a co-axial crank pin collar shaft having a matching non-circular cross-section, and the crank pin collar shaft is mounted perpendicularly on
 d) an auxiliary input shaft, such that a longitudinal axis of the crank pin is coplanar and parallel and at an offset distance to a longitudinal axis of the auxiliary input shaft, wherein the offset distance can be altered by displacing the crank pin by
B) a crank pin displacement mechanism comprising:
 a. a sliding collar disposed co-axially with the auxiliary input shaft, with a feature preventing relative angular displacement between the sliding collar and the auxiliary input shaft while allowing relative translation,
 b. a link assembly comprising:
  i. a link having a first end and a second end, the first end connected to the crank pin collar by
  ii. a crank pin pivot pin, the second end connected to the sliding collar by
  iii. a sliding collar pivot pin, wherein an axial displacement of the sliding collar causes radial movement of the crank pin through the link assembly,
 c. at least one thrust bearing that is co-axially placed in contact with the sliding collar, such that an external force applied on the thrust bearing causes an axial displacement of the thrust bearing and the sliding collar with respect to the auxiliary input shaft, which alters the offset distance by moving the crank pin collar together with the crank pin along the crank pin collar shaft,
 d. a slotted rack holder comprising one or more racks, which is restricted to only move along a direction of a longitudinal axis of the one or more racks, and a crank pin slot for receiving the crank pin, with a longitudinal axis of the crank pin slot orthogonal to the one or more racks,
B) an input shaft,
C) at least one driving non-circular gear mounted on the input shaft and driving
D) at least one driven non-circular gear mounted co-axially on the auxiliary input shaft, at a fixed orientation to the axis of the crank pin shaft and
E) at least one rectifier module comprising:
 a. a pinion engaged with the one or more racks, and mounted on
 b. a pinion shaft through
 c. a computer-controlled clutch, a one-way bearing, or a ratchet mechanism;
arranged such that a uniform rotation of the at least one driving non-circular gear via the input shaft, causes a non-uniform angular velocity of the auxiliary input shaft via the at least one driven non-circular gear, causing the crank pin to revolve around the auxiliary input shaft reciprocating the one or more racks substantially along a longitudinal direction of the one or more racks at a substantially constant velocity and slowing down briefly during direction reversal and accelerating to the constant velocity, where a magnitude of the reciprocation is proportional to the offset distance of the crank pin and the auxiliary input shaft, and the reciprocation of the rack causes an alternating rotation of the pinion and the rotation of the pinion is converted to a unidirectional rotation of an output gear, or output sprocket mounted on the pinion shaft via the computer controlled clutch, the one way bearing or the ratchet mechanism.

20. The infinitely variable transmission of claim 19, wherein the feature preventing relative angular displacement while allowing relative translation between the sliding collar and the auxiliary input shaft is further defined as the auxiliary input shaft having a non-circular cross section and the sliding collar having a non-circular orifice matching the non-circular cross section.

* * * * *